United States Patent
Hu et al.

(10) Patent No.: US 11,812,484 B2
(45) Date of Patent: *Nov. 7, 2023

(54) DATA TRANSMISSION METHOD, DEVICE, AND DATA TRANSMISSION SYSTEM

(71) Applicant: Huawei Technologies Co., Ltd., Shenzhen (CN)

(72) Inventors: Yong Hu, Shenzhen (CN); Qi Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,668

(22) Filed: Aug. 16, 2022

(65) Prior Publication Data

US 2022/0408503 A1    Dec. 22, 2022

Related U.S. Application Data

(63) Continuation of application No. 16/805,164, filed on Feb. 28, 2020, now Pat. No. 11,457,489, which is a
(Continued)

(30) Foreign Application Priority Data

Aug. 29, 2017 (CN) .......................... 201710758898.2

(51) Int. Cl.
*H04W 76/12* (2018.01)
*H04W 76/11* (2018.01)
*H04W 84/12* (2009.01)

(52) U.S. Cl.
CPC ............ *H04W 76/12* (2018.02); *H04W 76/11* (2018.02); *H04W 84/12* (2013.01)

(58) Field of Classification Search
CPC ...... H04W 76/12; H04W 76/11; H04W 84/12
See application file for complete search history.

(56) References Cited

U.S. PATENT DOCUMENTS 11,457,489 B2 * 9/2022 Hu ........................ H04W 88/16
2004/0053627 A1    3/2004 Fiter et al.
(Continued)

FOREIGN PATENT DOCUMENTS

CN          101489221 A         7/2009
CN          101808361 A         8/2010
(Continued)

OTHER PUBLICATIONS

OTD, TS 23. 501: Update to PDU session types, 3GPP TSG SA WG2 #122BIS S2-176417, Aug. 21-25, 2017, 4 pages.
(Continued)

*Primary Examiner* — Mohammad S Anwar
(74) *Attorney, Agent, or Firm* — Conley Rose, P.C.

(57) ABSTRACT

A data transmission method, a device, and a data transmission system implement local interaction between two terminals when the two terminals are served by different UPF entities. The method performed by a first user plane function entity includes receiving a data packet from a first terminal through an uplink path corresponding to the first terminal, where the data packet carries addressing information of a second terminal; determining path information of a second user plane function entity based on information about the uplink path corresponding to the first terminal and the addressing information of the second terminal; sending the data packet to the second user plane function entity based on the path information of the second user plane function entity; and sending the data packet to the second terminal through a downlink path corresponding to the second terminal.

23 Claims, 15 Drawing Sheets

Related U.S. Application Data continuation of application No. PCT/CN2018/101432, filed on Aug. 21, 2018.

(56) References Cited

U.S. PATENT DOCUMENTS

| | | |
|---|---|---|
| 2010/0020812 A1 | 1/2010 | Nakamura et al. |
| 2012/0082073 A1 | 4/2012 | Andreasen et al. |
| 2012/0177052 A1 | 7/2012 | Chen et al. |
| 2013/0258967 A1 | 10/2013 | Watfa et al. |
| 2013/0322346 A1 | 12/2013 | Comeau et al. |
| 2014/0105067 A1 | 4/2014 | Chen et al. |
| 2014/0341112 A1 | 11/2014 | Agiwal et al. |
| 2016/0135219 A1 | 5/2016 | Jain et al. |
| 2016/0262197 A1 | 9/2016 | He et al. |
| 2017/0055306 A1 | 2/2017 | Li et al. |
| 2018/0199243 A1 | 7/2018 | Bharatia |

FOREIGN PATENT DOCUMENTS

| | | |
|---|---|---|
| CN | 101888338 A | 11/2010 |
| CN | 102025700 A | 4/2011 |
| CN | 102739541 A | 10/2012 |
| CN | 105247947 A | 1/2016 |
| CN | 106102106 A | 11/2016 |
| CN | 106900081 A | 6/2017 |
| CN | 105122888 A | 5/2019 |
| KR | 20140134627 A | 11/2014 |
| WO | 2016134752 A1 | 9/2016 |
| WO | 2017078702 A1 | 5/2017 |

OTHER PUBLICATIONS

InterDigital, P-CR for TS23. 502: Procedure to insert UPF for UL-CL or activating multihomed PDU session, 3GPP TSG SA WG2 #120 S2-171974, Mar. 27-31, 2017, 5 pages.

"3rd Generation Partnership Project; Technical Specification Group Services and System Aspects; Study on control and user plane separation of EPC nodes (Release 14)," 3GPP TR 23.714 V14.0.0, Jun. 2016, 87 pages.

"3rd Generation Partnership Project; Technical Specification Group Services and System Aspects; System Architecture for the 5G System; Stage 2 (Release 15)" 3GPP TS 23.501 V1.2.0, Jul. 2017, 166 pages.

"3rd Generation Partnership Project; Technical Specification Group Services and System Aspects; Procedures for the 5G System; Stage 2 (Release 15)," 3GPP TS 23.502 V0.6.0, Aug. 17, 2017, 148 pages.

"3rd Generation Partnership Project; Technical Specification Group Core Network and Terminals; Interface between the Control Plane and the User Plane of EPC Nodes; Stage 3 (Release 14)," 3GPP TS 29.244 V14.0.0, Jun. 2017, 137 pages.

Lin, X., et al., "An Overview of 3GPP Device-to-Device Proximity Services," IEEE Communications Magazine, vol. 52, Issue: 4, Apr. 2014, 9 pages.

\* cited by examiner

DATA TRANSMISSION METHOD, DEVICE, AND DATA TRANSMISSION SYSTEM

CROSS-REFERENCE TO RELATED APPLICATIONS

This is a continuation of U.S. patent application Ser. No. 16/805,164, filed on Feb. 28, 2020, which is a continuation of International Patent Application No. PCT/CN2018/101432, filed on Aug. 21, 2018, which claims priority to Chinese Patent Application No. 201710758898.2, filed on Aug. 29, 2017. All the aforementioned applications are hereby incorporated by reference in their entireties.

TECHNICAL HELD

This application relates to the field of communications technologies, and in particular, to a data transmission method, a device, and a data transmission system.

BACKGROUND

A local area network (LAN) is a computer communications network in which all computers, external devices, databases, and the like in a local geographical area such as a school, a factory, or a department are connected to each other. The LAN can be connected to a remote local area network, a remote database, or a remote data center using a data communications network or a dedicated data circuit, to form an information processing system that covers a wide area. As a new enterprise office mode and a smart home mode emerge, disadvantages of a wired LAN and a wireless LAN (WLAN) with respect to complex deployment, flexibility, mobility, and coverage are exposed. This promotes further development of a LAN technology, to meet a requirement of a future application for the LAN.

A network that directly provides a LAN service based on a wide coverage feature of a mobile network is referred to as a mobile local area network (MLAN). The MLAN may be applied in a wider mobile network coverage range. To be more specific, whether users are in a same region, LAN-based data exchange or communication can be implemented, provided that the users join a same MLAN. Based on the mobile network that has wide coverage, creation, scaling, migration, and adjustment of the MLAN may be automatically completed by the mobile network, without manual intervention. In addition, the MLAN may be customized as required, and different MLANs are securely isolated from each other.

However, in the MLAN, when two terminals are served by different user plane function (UPF) entities, there is no related solution for implementing local interaction between the two terminals.

SUMMARY

Embodiments of this application provide a data transmission method, a device, and a data transmission system, to implement local interaction between two terminals when the two terminals are served by different UPF entities.

To achieve the foregoing objective, the embodiments of this application provide the following technical solutions.

According to a first aspect, a data transmission method is provided, and the method includes receiving, by a first user plane function entity, a data packet from a first terminal through an uplink path corresponding to the first terminal, where the data packet carries addressing information of a second terminal, and the first user plane function entity is a user plane function entity currently accessed by the first terminal; determining, by the first user plane function entity, path information of the second user plane function entity based on information about the uplink path corresponding to the first terminal and the addressing information of the second terminal, where the second user plane function entity is a user plane function entity currently accessed by the second terminal; sending, by the first user plane function entity, the data packet to the second user plane function entity based on the path information of the second user plane function entity; and sending, by the second user plane function entity, the data packet to the second terminal through a downlink path corresponding to the second terminal. Based on the data transmission method provided in this embodiment of this application, after receiving the data packet from the first terminal through the uplink path corresponding to the first terminal, the first user plane function entity may determine the path information of the second user plane function entity based on the information about the uplink path corresponding to the first terminal and the addressing information of the second terminal, and may further send the data packet to the second user plane function entity based on the path information of the second user plane function entity. Additionally, the second user plane function entity sends the data packet to the second terminal through the downlink path corresponding to the second terminal. This can implement local interaction between the two terminals when the two terminals are served by different user plane function entities.

In a possible design, the determining, by the first user plane function entity, path information of a second user plane function entity based on information about the uplink path corresponding to the first terminal and the addressing information of the second terminal includes determining, by the first user plane function entity based on the information about the uplink path corresponding to the first terminal, an identity of a mobile local area network MLAN to which the first terminal subscribes; and determining, by the first user plane function entity, the path information of the second user plane function entity based on the identity of the MLAN and the addressing information of the second terminal. Based on this solution, the first user plane function entity may determine the path information of the second user plane function entity.

In a possible design, after the determining, by the first user plane function entity based on the information about the uplink path corresponding to the first terminal, an identity of an MLAN to which the first terminal subscribes, the method further includes determining, by the first user plane function entity based on the identity of the MLAN and the addressing information of the second terminal, that information about the downlink path corresponding to the second terminal is not stored. In this way, the first user plane function entity may determine that the first terminal and the second terminal are served by different user plane function entities.

In a possible design, the determining, by the first user plane function entity based on the information about the uplink path corresponding to the first terminal, an identity of an MLAN to which the first terminal subscribes includes determining, by the first user plane function entity based on the information about the uplink path corresponding to the first terminal and a first correspondence, the identity of the MLAN to which the first terminal subscribes, where the first correspondence includes a correspondence between the information about the uplink path corresponding to the first terminal and the identity of the MLAN. Based on this solution, the first user plane function entity may determine the identity of the MLAN to which the first terminal subscribes.

In a possible design, the method further includes obtaining, by the first user plane function entity, the identity of the MLAN to which the first terminal subscribes and the information about the uplink path corresponding to the first terminal; and establishing, by the first user plane function entity, the first correspondence based on the identity of the MLAN and the information about the uplink path corresponding to the first terminal. Based on this solution, the first user plane function entity may establish the first correspondence.

In a possible design, the determining, by the first user plane function entity, the path information of the second user plane function entity based on the identity of the MLAN and the addressing information of the second terminal includes determining, by the first user plane function entity, the path information of the second user plane function entity based on the identity of the MLAN, the addressing information of the second terminal, and a second correspondence, where the second correspondence includes a correspondence between the addressing information of the second terminal, the path information of the second user plane function entity, and the identity of the MLAN. Based on this solution, the first user plane function entity may determine the path information of the second user plane function entity.

In a possible design, the method further includes obtaining, by the first user plane function entity, the addressing information of the second terminal, the path information of the second user plane function entity, and the identity of the MLAN; and establishing, by the first user plane function entity, the second correspondence based on the addressing information of the second terminal, the path information of the second user plane function entity, and the identity of the MLAN. Based on this solution, the first user plane function entity may establish the second correspondence.

In a possible design, the obtaining, by the first user plane function entity, the addressing information of the second terminal, the path information of the second user plane function entity, and the identity of the MLAN includes receiving, by the first user plane function entity from a session management function entity, the addressing information of the second terminal, the path information of the second user plane function entity, and the identity of the MLAN. Based on this solution, the first user plane function entity may obtain the addressing information of the second terminal, the path information of the second user plane function entity, and the identity of the MLAN.

In a possible design, the determining, by the first user plane function entity, the path information of the second user plane function entity based on the identity of the MLAN and the addressing information of the second terminal includes sending, by the first user plane function entity, the identity of the MLAN and the addressing information of the second terminal to the session management function entity, where the identity of the MLAN and the addressing information of the second terminal are used to determine the path information of the second user plane function entity; and receiving, by the first user plane function entity, the path information of the second user plane function entity from the session management function entity. Based on this solution, the first user plane function entity may determine the path information of the second user plane function entity.

In a possible design, the information about the uplink path corresponding to the first terminal includes a tunnel identifier of the first user plane function entity allocated for the first terminal, the information about the downlink path corresponding to the second terminal includes a tunnel identifier of an access device allocated for the second terminal, and the path information of the second user plane function entity includes a tunnel identifier of the second user plane function entity.

According to a second aspect, a data transmission method is provided, and the method includes receiving, by a first user plane function entity, a data packet from a first terminal through an uplink path corresponding to the first terminal, where the data packet carries addressing information of a second terminal, and the first user plane function entity is a user plane function entity currently accessed by the first terminal; determining, by the first user plane function entity, path information of a second user plane function entity based on information about the uplink path corresponding to the first terminal and the addressing information of the second terminal, where the second user plane function entity is a user plane function entity currently accessed by the second terminal; sending, by the first user plane function entity, the data packet to the second user plane function entity based on the path information of the second user plane function entity; and receiving, by the second user plane function entity, the data packet from the first user plane function entity, and sending the data packet to the second terminal through a downlink path corresponding to the second terminal. Based on the data transmission method provided in this embodiment of this application, after receiving the data packet from the first terminal through the uplink path corresponding to the first terminal, the first user plane function entity may determine the path information of the second user plane function entity based on the information about the uplink path corresponding to the first terminal and the addressing information of the second terminal, and may further send the data packet to the second user plane function entity based on the path information of the second user plane function entity. Additionally, the second user plane function entity sends the data packet to the second terminal through the downlink path corresponding to the second terminal. This can implement local interaction between the two terminals when the two terminals are served by different user plane function entities.

In a possible design, the method further includes determining, by the second user plane function entity based on the path information of the second user plane function entity and the addressing information of the second terminal, the downlink path corresponding to the second terminal. Based on the solution, the second user plane function entity may determine the downlink path corresponding to the second terminal.

In a possible design, the determining, by the second user plane function entity based on the path information of the second user plane function entity and the addressing information of the second terminal, the downlink path corresponding to the second terminal includes determining, by the second user plane function entity based on the path information of the second user plane function entity, an identity of a mobile local area network MLAN to which the second terminal subscribes; and determining, by the second user plane function entity based on the identity of the MLAN and the addressing information of the second terminal, the downlink path corresponding to the second terminal. Based on the solution, the second user plane function entity may determine the downlink path corresponding to the second terminal.

In a possible design, the determining, by the second user plane function entity based on the path information of the second user plane function entity, an identity of an MLAN to which the second terminal subscribes includes determining, by the second user plane function entity based on the path information of the second user plane function entity and a third correspondence, the identity of the MLAN to which the second terminal subscribes, where the third correspondence includes a correspondence between the path information of the second user plane function entity and the identity of the MLAN. Based on this solution, the second user plane function entity may determine the identity of the MLAN to which the second terminal subscribes.

In a possible design, the determining, by the second user plane function entity based on the identity of the MLAN and the addressing information of the second terminal, the downlink path corresponding to the second terminal includes determining, by the second user plane function entity based on the identity of the MLAN, the addressing information of the second terminal, and a fourth correspondence, the downlink path corresponding to the second terminal, where the fourth correspondence includes a correspondence between information about the downlink path corresponding to the second terminal, the addressing information of the second terminal, and the identity of the MLAN. Based on the solution, the second user plane function entity may determine the downlink path corresponding to the second terminal.

In a possible design, the method further includes obtaining, by the second user plane function entity, the path information of the second user plane function entity and the identity of the MLAN; and establishing, by the second user plane function entity, the third correspondence based on the path information of the second user plane function entity and the identity of the MLAN. Based on this solution, the second user plane function entity may establish the third correspondence.

In a possible design, the method further includes obtaining, by the second user plane function entity, the addressing information of the second terminal, where the addressing information of the second terminal includes an Internet Protocol (IP) address of the second terminal or a media access control (MAC) address of the second terminal. Based on this solution, the second user plane function entity may obtain the addressing information of the second terminal.

In a possible design, the addressing information of the second terminal includes the IP address of the second terminal and the obtaining, by the second user plane function entity, the addressing information of the second terminal includes receiving, by the second user plane function entity, the IP address of the second terminal from a session management function entity, where the IP address of the second terminal is determined based on the identity of the MLAN. Based on this solution, the second user plane function entity may obtain the IP address of the second terminal.

In a possible design, the addressing information of the second terminal includes the MAC address of the second terminal and the obtaining, by the second user plane function entity, the addressing information of the second terminal includes in a process of establishing an MLAN session, receiving, by the second user plane function entity, the MAC address of the second terminal from the second terminal. Based on this solution, the second user plane function entity may obtain the MAC address of the second terminal.

In a possible design, the addressing information of the second terminal includes the MAC address of the second terminal and the obtaining, by the second user plane function entity, the addressing information of the second terminal includes receiving, by the second user plane function entity, a Dynamic Host Configuration Protocol (DHCP) request from the second terminal through the uplink path of the second terminal, where the DHCP request carries the MAC address of the second terminal; sending, by the second user plane function entity, the DHCP request to the session management function entity; and receiving, by the second user plane function entity, the MAC address of the second terminal from the session management function entity. Based on this solution, the second user plane function entity may obtain the MAC address of the second terminal.

In a possible design, the addressing information of the second terminal includes the MAC address of the second terminal and the obtaining, by the second user plane function entity, the addressing information of the second terminal includes receiving, by the second user plane function entity, the DHCP request from the second terminal through the uplink path of the second terminal, where the MCP request carries the MAC address of the second terminal; and parsing, by the first user plane function entity, the DHCP request to obtain the MAC address of the second terminal. Based on this solution, the second user plane function entity may obtain the MAC address of the second terminal.

In a possible design, the method further includes obtaining, by the second user plane function entity, the identity of the MLAN to which the second terminal subscribes and the information about the downlink path corresponding to the second terminal; and establishing, by the second user plane function entity, the fourth correspondence based on the identity of the MLAN, the addressing information of the second terminal, and the information about the downlink path corresponding to the second terminal. Based on this solution, the second user plane function entity may establish the fourth correspondence.

In a possible design, before the receiving, by the second user plane function entity, the DHCP request from the second terminal through the uplink path of the second terminal, the method further includes obtaining, by the second user plane function entity, the information about the uplink path corresponding to the second terminal, the identity of the MLAN to which the second terminal subscribes, and the information about the downlink path corresponding to the second terminal; establishing, by the second user plane function entity, a fifth correspondence based on the information about the uplink path corresponding to the second terminal, the information about the downlink path corresponding to the second terminal, and the identity of the MLAN; where the fifth correspondence includes a correspondence between the information about the uplink path corresponding to the second terminal, the information about the downlink path corresponding to the second terminal, and the identity of the MLAN; and after the receiving, by the second user plane function entity, the DHCP request from the second terminal through the uplink path of the second terminal, the method further includes establishing, by the second user plane function entity, the fourth correspondence based on the fifth correspondence and the MAC address of the second terminal. Based on this solution, the second user plane function entity may establish the fourth correspondence.

In a possible design, the information about the uplink path corresponding to the first terminal includes a tunnel identifier of the first user plane function entity allocated for the first terminal; the information about the downlink path corresponding to the second terminal includes a tunnel identifier of an access device allocated for the second terminal; and the path information of the second user plane function entity includes a tunnel identifier of the second user plane function entity.

According to a third aspect, a first user plane function entity is provided. The first user plane function entity has a function of implementing the method in the first aspect. The function may be implemented by hardware, or may be implemented by the hardware by executing corresponding software. The hardware or the software includes one or more modules corresponding to the function.

According to a fourth aspect, a first user plane function entity including a processor and a memory is provided. The memory is configured to store a computer executable instruction; and when the first user plane function entity runs, the processor executes the computer executable instruction stored in the memory, and the first user plane function entity is enabled to perform the data transmission method in any possible implementation of the first aspect.

According to a fifth aspect, a computer-readable storage medium is provided, where the computer-readable storage medium stores an instruction, and when the instruction is run on a computer, the computer is enabled to perform the data transmission method in any possible implementation of the first aspect.

According to a sixth aspect, a computer program product including an instruction is provided. When the instruction is run on a computer, the computer is enabled to perform the data transmission method in any possible implementation of the first aspect.

According to a seventh aspect, a chip system is provided. The chip system includes a processor configured to support a first user plane function entity in implementing functions in the foregoing aspects, for example, determining the path information of the second user plane function entity based on the information about the uplink path corresponding to the first terminal and the addressing information of the second terminal. In a possible design, the chip system further includes a memory. The memory is configured to store a program instruction and data that are required by the first user plane function entity. The chip system may include a chip, or may include a chip and another discrete component.

For technical effects brought by any design manner of the third aspect to the seventh aspect, refer to technical effects brought by different design manners of the first aspect. Details are not described herein again.

According to an eighth aspect, a data transmission system is provided, and the data transmission system includes a first user plane function entity and a second user plane function entity. The first user plane function entity is configured to receive a data packet from a first terminal through an uplink path corresponding to the first terminal, where the data packet carries addressing information of a second terminal, and the first user plane function entity is a user plane function entity currently accessed by the first terminal. The first user plane function entity is further configured to determine path information of a second user plane function entity based on information about the uplink path corresponding to the first terminal and the addressing information of the second terminal, where the second user plane function entity is a user plane function entity currently accessed by the second terminal. The first user plane function entity is further configured to send the data packet to the second user plane function entity based on the path information of the second user plane function entity. The second user plane function entity is configured to receive the data packet from the first user plane function entity, and send the data packet to the second terminal through a downlink path corresponding to the second terminal. Based on the data transmission system provided in this embodiment of this application, after receiving the data packet from the first terminal through the uplink path corresponding to the first terminal, the first user plane function entity may determine the path information of the second user plane function entity based on the information about the uplink path corresponding to the first terminal and the addressing information of the second terminal, and may further send the data packet to the second user plane function entity based on the path information of the second user plane function entity; and the second user plane function entity sends the data packet to the second terminal through the downlink path corresponding to the second terminal. This can implement local interaction between the two terminals when the two terminals are served by different user plane function entities.

The aspects or other aspects in this application may be clearer and easier to understand in descriptions in the following embodiments.

DESCRIPTION OF EMBODIMENTS

Figure 1:
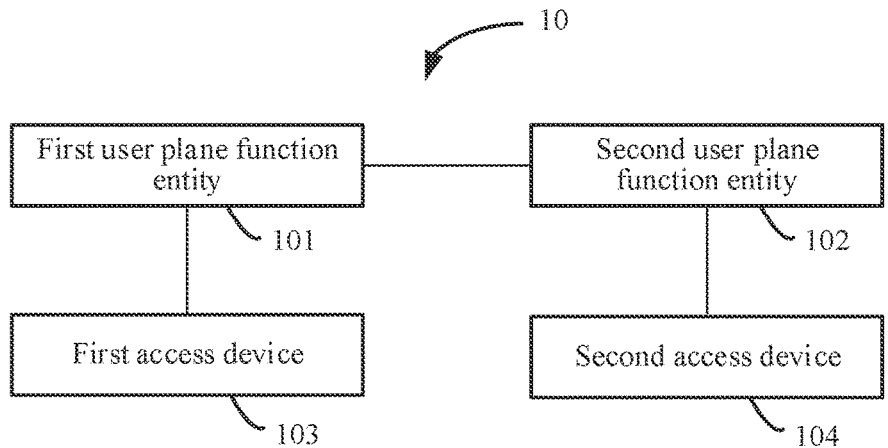
FIG. 1 is a schematic structural diagram of a data transmission system according to an embodiment of this application.

For ease of understanding technical solutions in the embodiments of this application, the following first briefly describes technologies related to this application.

Identity (ID) of an MLAN.

An identity of an MLAN is used to identify an MLAN instance. If MLANs are classified by scenario, for example, an enterprise or vehicle-to-everything communication (V2X), a type of MLAN scenario may be identified using an MLAN type or a data network name (DNN). To be more specific, an identity of an MLAN includes a scenario identifier and an MLAN number, and an MLAN instance in a type of MLAN scenario can be uniquely identified with reference to a scenario identifier and an MLAN number. If DNN resources are sufficient, and the MLANs do not need to be classified by scenario, an identity of an MLAN corresponds to a unique MLAN instance in a DNN. Whether the MLANs are classified by scenario is not specifically limited in the following embodiments of this application, and an example in which an identity of an MLAN can uniquely identify an MLAN instance is used for description. A general description is provided herein, and details are not described below again.

In addition, in the embodiments of this application, the identity of the MLAN may correspond to a service area, or the identity of the MLAN may be available globally. A service range corresponding to the identity of the MLAN is not specifically limited in the embodiments of this application.

Tunnel.

Tunnels include a next generation (N) interface 3 (N3) tunnel and an N interface 9 (N9) tunnel. The N3 tunnel is a tunnel between an access device (for example, a base station) and a UPF entity. The N9 tunnel is a tunnel between UPF entities. Generally, the N3 tunnel is a tunnel at a session granularity, and the N9 tunnel may be a tunnel at a session granularity, or a tunnel at a device granularity.

The tunnel at a session granularity is a tunnel resource established for one session, and the tunnel is used for only one session. One tunnel at a session granularity includes only one routing rule, and only the routing rule can correspond to the tunnel for forwarding data. In addition, a lifecycle of the tunnel at a session granularity is a lifecycle of one session. To be more specific, when the session disappears or is released, the tunnel at a session granularity also needs to be released.

The tunnel at a device granularity is a tunnel resource established for one or more sessions, and the tunnel may be used for one or more sessions. One tunnel at a device granularity may include one or more routing rules, and each of the one or more routing rules can correspond to the tunnel for forwarding data. In addition, a lifecycle of the tunnel at a device granularity is a lifecycle of a plurality of sessions corresponding to the tunnel. To be more specific, assuming that the tunnel at a device granularity corresponds to M sessions, when the first M−1 sessions in the plurality of sessions corresponding to the tunnel disappear or are released, only routing rules corresponding to the corresponding sessions are released; and the tunnel at a device granularity can be released only when an $M^{th}$ session in the plurality of sessions corresponding to the tunnel disappears or is released. Certainly, when the $M^{th}$ session in the plurality of sessions corresponding to the tunnel disappears or is released, the tunnel at a device granularity may be alternatively retained, such that the tunnel does not need to be re-established subsequently. This is not specifically limited in the embodiments of this application.

A session in the embodiments of this application may be, for example, a packet data unit (PDU) session. A general description is provided herein, and details are not described below again.

A tunnel in the following embodiments of this application not only relates to the N3 tunnel, but also relates to the N9 tunnel. A general description is provided herein, and details are not described below again.

Path Information.

Path information in the embodiments of this application includes information about an uplink path corresponding to a first terminal, information about a downlink path corresponding to the first terminal, information about an uplink path corresponding to a second terminal, information about a downlink path corresponding to the second terminal, path information of a first user plane function entity and path information of a second user plane function entity. The information about the uplink path corresponding to the first terminal is used to determine the uplink path corresponding to the first terminal, and the information about the downlink path corresponding to the first terminal is used to determine the downlink path corresponding to the first terminal. The information about the uplink path corresponding to the second terminal is used to determine the uplink path corresponding to the second terminal, and the information about the downlink path corresponding to the second terminal is used to determine the downlink path corresponding to the second terminal. The path information of the first user plane function entity is used to determine the first user plane function entity, and the path information of the second user plane function entity is used to determine the second user plane function entity. In addition, the information about the uplink path corresponding to the first terminal and the information about the downlink path corresponding to the first terminal may be further used to determine a tunnel that is established between a first access device and the first user plane function entity for the first terminal. The information about the uplink path corresponding to the second terminal and the information about the downlink path corresponding to the second terminal may be further used to determine a tunnel that is established between a second access device and the second user plane function entity for the second terminal. The path information of the first user plane function entity and the path information of the second user plane function entity may be further used to determine a tunnel established between the first user plane function entity and the second user plane function entity.

In the embodiments of this application, an example in which the first user plane function entity and the second user plane function entity are different user plane function entities is used for description. Certainly, the first user plane function entity and the second user plane function entity may be alternatively a same user plane function entity. This is not specifically limited in the embodiments of this application.

In the embodiments of this application, the information about the uplink path corresponding to the first terminal may include a tunnel identifier of the first UPF entity allocated for the first terminal, the information about the downlink path corresponding to the first terminal may include a tunnel identifier of the first access device allocated for the first terminal, the information about the uplink path corresponding to the second terminal may include a tunnel identifier of the second UPF entity allocated for the second terminal, the information about the downlink path corresponding to the second terminal may include a tunnel identifier of the second access device allocated for the second terminal, the path information of the first user plane function entity includes the tunnel identifier of the first user plane function entity, and the path information of the second user plane function entity includes the tunnel identifier of the second user plane function entity. The tunnel identifier may be, for example, a tunnel endpoint identifier (TEID). This is not specifically limited in the embodiments of this application.

Certainly, the information about the uplink path corresponding to the first terminal, the information about the downlink path corresponding to the first terminal, the information about the uplink path corresponding to the second terminal, the information about the downlink path corresponding to the second terminal, the path information of the first user plane function entity, and the path information of the second user plane function entity may further include other information. For example, the information about the uplink path corresponding to the first terminal may further include an IP address of the first user plane function entity, the information about the downlink path corresponding to the first terminal may further include an IP address of the first access device, the information about the uplink path corresponding to the second terminal may further include an IP address of the second user plane function entity, the information about the downlink path corresponding to the second terminal may further include an IP address of the second access device, the path information of the first user plane function entity may further include the IP address of the first user plane function entity and the path information of the second user plane function entity may further include the IP address of the second user plane function entity. This is not specifically limited in the embodiments of this application.

The following describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in descriptions of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" are not intended to limit a quantity or an execution sequence; and the terms such as "first" and "second" do not indicate a definite difference.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that as the network architecture evolves and new service scenarios emerge, the technical solutions provided in the embodiments of this application are further applicable to a similar technical problem.

FIG. 1 is a schematic structural diagram of a data transmission system 10 according to an embodiment of this application. The data transmission system 10 includes a first user plane function entity 101, a second user plane function entity 102, a first access device 103, and a second access device 104.

A first terminal communicates with the first user plane function entity 101 using the first access device 103. A second terminal communicates with the second user plane function entity 102 using the second access device 104.

The first user plane function entity 101 is configured to receive a data packet from the first terminal through an uplink path corresponding to the first terminal. The data packet carries addressing information of a second terminal. The first user plane function entity 101 is a user plane function entity currently accessed by the first terminal.

The first user plane function entity 101 is further configured to determine path information of the second user plane function entity 102 based on information about the uplink path corresponding to the first terminal and the addressing information of the second terminal. The second user plane function entity 102 is a user plane function entity currently accessed by the second terminal.

The first user plane function entity 101 is further configured to send the data packet to the second user plane function entity 102 based on the path information of the second user plane function entity 102.

The second user plane function entity 102 is further configured to receive the data packet from the first user plane function entity 101, and send the data packet to the second terminal through a downlink path corresponding to the second terminal.

It should be noted that in this embodiment of this application, an example in which the first user plane function entity 101 and the second user plane function entity 102 are different user plane function entities is used for description. Certainly, the first user plane function entity 101 and the second user plane function entity 102 may be alternatively a same user plane function entity. This is not specifically limited in this embodiment of this application.

Optionally, in this embodiment of this application, the first user plane function entity 101 may directly communicate with the first access device 103, or may communicate with the first access device 103 through forwarding by another device. The second user plane function entity 102 may directly communicate with the second access device 104, or may communicate with the second access device 104 through forwarding by another device. This is not specifically limited in this embodiment of this application.

Based on the data transmission system provided in this embodiment of this application, after receiving the data packet from the first terminal through the uplink path corresponding to the first terminal, the first user plane function entity may determine the path information of the second user plane function entity based on the information about the uplink path corresponding to the first terminal and the addressing information of the second terminal, and may further send the data packet to the second user plane function entity based on the path information of the second user plane function entity; and the second user plane function entity sends the data packet to the second terminal through the downlink path corresponding to the second terminal. This can implement local interaction between the two terminals when the two terminals are served by different user plane function entities.

Optionally, the data transmission system 10 may be applied to a 5th generation (5G) network and other future networks. This is not specifically limited in this embodiment of this application.

Figure 2:
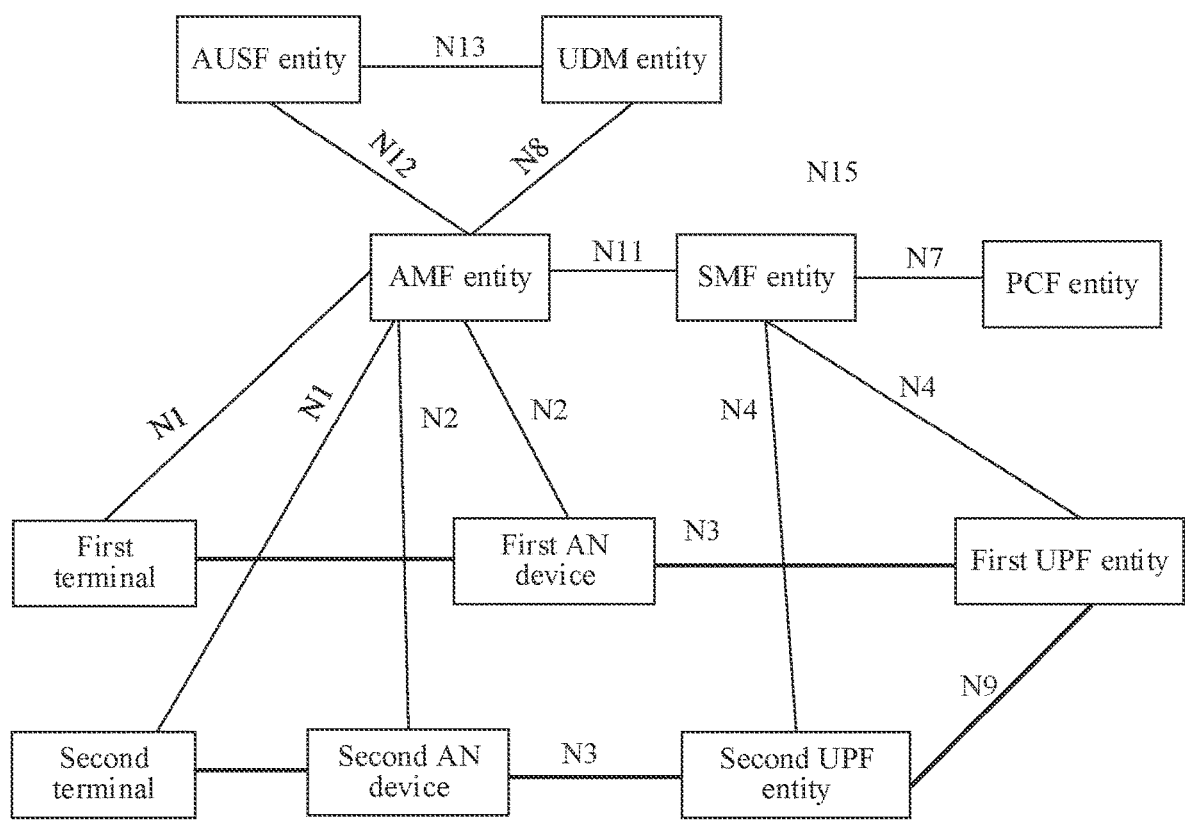
FIG. 2 is a schematic diagram of a data transmission system applied in a $5^{th}$ generation (5G) according to an embodiment of this application.

If the data transmission system 10 is applied to the 5G network, as shown in FIG. 2, a network element or an entity corresponding to the first user plane function entity 101 may be a first UPF entity, a network element or an entity corresponding to the second user plane function entity 102 may be a second UPF entity, a network element or an entity corresponding to the first access device 103 may be a first access network (AN) device, and a network element or an entity corresponding to the second access device 104 may be a second AN device. The first terminal accesses a network using the first AN device. The second terminal accesses the network using the second AN device. The first AN device communicates with the first UPF entity through an N3 interface (N3). The second AN device communicates with the second UPF entity through N3.

In addition, as shown in FIG. 2, the 5G network may further include an access and mobility management function (AMF) entity, a session management function (SMF) entity, a unified data management (UDM) entity, an authentication server function (AUSF) entity, a policy control function (PCF) entity, and the like. This is not specifically limited in this embodiment of this application.

Both the first terminal and the second terminal communicate with the AMF entity through an N1 interface (N1). Both the first AN device and the second AN device communicate with the AMF entity through an N2 interface (N2). The AMF entity communicates with the AUSF entity through an N12 interface (N12). The AMF entity communicates with the UDM entity through an N8 interface (N8). The AMF entity communicates with the SMF entity through an N11 interface (N11). The AMF entity communicates with the PCF entity through an N15 interface (N15). The AUSF entity communicates with the UDM entity through an N13 interface (N13). The SMF entity communicates with the first UPF entity and the second UPF entity through an N4 interface (N4).

Optionally, an example in which the first AN device and the second AN device are communicatively connected to a same AMF entity is, used for description in FIG. 2. Certainly, the first AN device and the second AN device may be alternatively connected to different AMF entities. This is not specifically limited in this embodiment of this application.

Optionally, an example in which the first UPF entity and the second UPF entity are communicatively connected to a same SMF entity is used for description in FIG. 2. Certainly, the first UPF entity and the second UPF entity may be alternatively connected to different SMF entities. This is not specifically limited in this embodiment of this application.

It should be noted that names of the interfaces between the network elements in FIG. 2 are merely examples, and the interfaces may have other names during implementation. This is not specifically limited in this embodiment of this application.

It should be noted that the first AN device, the second AN device, the AMF entity, the SMF entity, the AUSF entity, the UDM entity, the first UPF entity, the second UPF entity, the PCF entity and the like in FIG. 2 are merely names, and the names constitute no limitation on the devices. In the 5G network and other future networks, network elements or entities corresponding to the first AN device, the second AN device, the AMF entity, the SMF entity, the AUSF entity, the UDM entity, the first UPF entity, the second UPF entity, and the PCF entity may have other names. This is not specifically limited in this embodiment of this application. For example, the UDM entity may be replaced with a home subscriber server (HSS), a user subscription database (USD), a database entity, or the like. A general description is provided herein, and details are not described below again.

Optionally, the terminal in this embodiment of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, and the like. For ease of description, the devices mentioned above are collectively referred to as a terminal in this application.

Optionally, the access device in this embodiment of this application is a device that accesses a core network, for example, a base station, a broadband network gateway (BNG), an aggregation switch, or a non-3rd Generation Partnership Project (3GPP) access device. The base station may include base stations in various forms, such as a macro base station, a micro base station (also referred to as a small cell), a relay station, and an access point.

Optionally, in this embodiment of this application, the first UPF entity has a function of the first user plane function entity shown in FIG. 1, the second UPF entity has a function of the second user plane function entity shown in FIG. 1, and the first UPF entity and the second UPF entity may further implement user plane functions of a serving gateway (SGW) and a packet data network gateway (PGW). In addition, the first UPF entity and the second UPF entity may be alternatively software-defined networking (SDN) switch. This is not specifically limited in this embodiment of this application.

Optionally, the AUSF entity in this embodiment of this application is configured to authenticate the terminal based on subscription data of the terminal.

Optionally, the UDM entity in this embodiment of this application is configured to store subscription data. In addition, the UDM entity further includes functions such as authentication, user identifier processing, and subscription management. This is not specifically limited in this embodiment of this application.

Optionally, the PCF entity in this embodiment of this application provides a policy rule, and supports a function related to a policy such as unified policy architecture management network behavior.

Optionally, the first user plane function entity and the second user plane function entity in FIG. 1 may be implemented by one physical device, may be jointly implemented by a plurality of physical devices, or may be a logical function module in a physical device. This is not specifically limited in this embodiment of this application.

Figure 3:
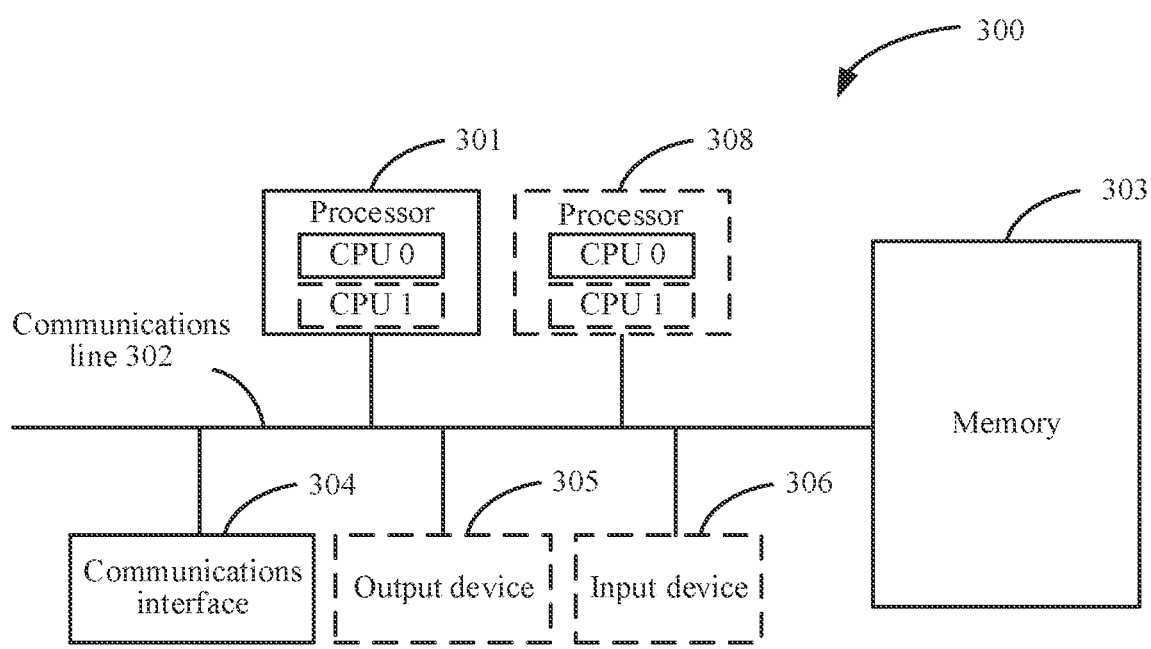
FIG. 3 is a schematic diagram of a hardware apparatus of a communications device according to an embodiment of this application.

For example, the first user plane function entity and the second user plane function entity in FIG. 1 may be implemented using a communications device in FIG. 3. FIG. 3 is a schematic diagram of a hardware structure of a communications device according to an embodiment of this application. The communications device 300 includes at least one processor 301, a communications line 302, a memory 303, and at least one communications interface 304.

The processor 301 may be a general-purpose central processing unit (CPU), a microprocessor, an application-specific integrated circuit (ASIC), or one or more integrated circuits configured to control program execution in the solutions in this application.

The communications line 302 may include a path for transmitting information between the foregoing components.

The communications interface 304, which uses any apparatus such as a transceiver, is configured to communicate with another device or a communications network, such as Ethernet, a radio access network (RAN), or a wireless local area network (WLAN).

The memory 303 may be a read-only memory (ROM) or another type of static storage device capable of storing static information and instructions, or a random-access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that is capable of carrying or storing expected program code in a form of instructions or data structures and that can be accessed by a computer, but is not limited thereto. The memory 303 may exist independently and is connected to the processor using the communications line 302. Alternatively, the memory 303 may be integrated with the processor.

The memory 303 is configured to store a computer executable instruction for implementing the solutions of this application, and the computer executable instruction is executed under control of the processor 301. The processor 301 is configured to execute the computer executable instruction stored in the memory 303, to implement a data transmission method provided in the following embodiments of this application.

Optionally, the computer executable instruction in this embodiment of this application may also be referred to as application program code. This is not specifically limited in this embodiment of this application.

During implementation, in an embodiment, the processor 301 may include one or more CPUs, for example, a CPU 0 and a CPU 1 in FIG. 3.

During implementation, in an embodiment, the communications device 300 may include a plurality of processors, for example, a processor 301 and a processor 308 in FIG. 3. Each of these processors may be a single-core (single-CPU) processor, or may be a multi-core (multi-CPU) processor. The processor herein may be one or more devices, circuits, and/or processing cores configured to process data (for example, a computer program instruction).

During implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive users' input in a plurality of manners. For example, the input device 306 may be a mouse cursor, a keyboard, a touchscreen device, or a sensing device.

The communications device 300 may be a general-purpose device or a dedicated device. During implementation, the communications device 300 may be a desktop computer, a portable computer, a network server, a personal digital assistant (PDA), a mobile phone, a tablet computer, a wireless terminal device, an embedded device, or a device with a structure similar to that in FIG. 3. A type of the communications device 300 is not limited in this embodiment of this application.

The following describes in detail a data transmission method provided in the embodiments of this application with reference to FIG. 1 to FIG. 3.

First, two typical scenarios that are applicable to the embodiments of this application are provided as follows.

Scenario 1, two terminals that access a same MLAN are served by different user plane function entities. For example, a first terminal is served by a first user plane function entity, and a second terminal is served by a second user plane function entity.

Scenario 2, before a terminal is handed over, two terminals that access a same MLAN are served by a same user plane function entity. After the terminal is handed over, the two terminals that access the same MLAN are served by different user plane function entities. For example, both a first terminal and a second terminal are originally served by a first user plane function entity. During communication between the first terminal and the second terminal, the second terminal moves, such that the second terminal is handed over to a second user plane function entity, and is served by the second user plane function entity. In this case, the first terminal and the second terminal are served by different user plane function entities.

Then, for example, the data transmission system shown in FIG. 1 is applied to the 5G network shown in FIG. 2. For the scenario 1, a data transmission method provided in an embodiment of this application may be shown in FIG. 4A to FIG. 4C, and includes the following steps.

S401a. A first terminal sends an MLAN session establishment request to an AMF entity, such that the AMF entity receives the MLAN session establishment request from the first terminal, where the MLAN session establishment request carries an identity of an MLAN to which the first terminal subscribes.

A process of configuring the identity of the MLAN to which the first terminal subscribes is described in the following embodiment. Details are not described herein.

Optionally, in this embodiment of this application, if the identity of the MLAN to which the first terminal subscribes corresponds to a service area, information about the specific service area corresponding to the identity of the MLAN is also configured on the first terminal. In this case, the first terminal may send, based on the information about the specific service area corresponding to the identity of the MLAN, the MLAN session establishment request to the AMF entity in the specific service area corresponding to the identity of the MLAN. Certainly, if the first terminal sends the MLAN session establishment request to the AMF entity beyond the specific service area corresponding to the identity of the MLAN, the AMF entity or an SMF entity may reject, after determining that a current location of the first terminal is not within the specific service area corresponding to the identity of the MLAN, the MLAN session establishment request sent by the first terminal. This is not specifically limited in this embodiment of this application. In this embodiment of this application, that the first terminal initiates a normal MLAN session establishment procedure is merely used as an example for description. To be more specific, when the identity of the MLAN to which the first terminal subscribes is available globally, the first terminal sends the MLAN session establishment request to the AMF entity. Alternatively, when the identity of the MLAN to which the first terminal subscribes corresponds to the specific service area, the first terminal sends the MILAN session establishment request in the specific service area corresponding to the identity of the MLAN to which the first terminal subscribes. A general description is provided herein, and details are not described below again.

S402a. The AMF entity selects the SMF entity.

For a manner in which the AMF entity selects the SMF entity, refer to an existing solution. Details are not described herein.

S403a. The AMF entity sends the MLAN session establishment request to the SMF entity, such that the SMF entity receives the MLAN session establishment request from the AMF entity.

S404a. The SMF entity selects a first UPF entity.

For a manner in which the SMF entity selects the first UPF entity, refer to an existing solution. Details are not described herein.

Optionally, in this embodiment of this application, the SMF entity may further obtain, from a UDM entity, the identity of the MLAN to which the first terminal subscribes, and determine that the identity of the MLAN carried in the MLAN session establishment request is the same as the identity of the MLAN to which the first terminal subscribes. If the identity of the MLAN carried in the MLAN session establishment request is the same as the identity of the MLAN to which the first terminal subscribes, it may be determined that the identity of the MLAN carried in the MLAN session establishment request is the identity of the MLAN to which the first terminal subscribes, and at least one or more subsequent operations may be performed. If the identity of the MLAN carried in the MILAN session establishment request is different from the identity of the MLAN to which the first terminal subscribes, it may be determined that the identity of the MLAN carried in the MLAN session establishment request is not the identity of the MLAN to which the first terminal subscribes, and a procedure ends. This is not specifically limited in this embodiment of this application.

S405a. The SMF entity sends an N4 session message 1 to the first UPF entity, such that the first UPF entity receives the N4 session message 1 from the SMF entity, where the N4 session message 1 carries the identity of the MLAN to which the first terminal subscribes and first-terminal addressing information.

Optionally, in this embodiment of this application, the first-terminal addressing information may be an Internet Protocol (IP) address or a media access control (MAC) address of the first terminal. This is not specifically limited in this embodiment of this application.

If the first-terminal addressing information is the IP address, the SMF entity may obtain the IP address of the first terminal in the following manner. An IP address pool corresponding to an identity of each MLAN is configured on the SMF entity, and a correspondence between the identity of the MLAN and information about the IP address pool is established. When the first terminal establishes an MLAN session, a corresponding IP address pool may be determined based on the identity of the MLAN to which the first terminal subscribes and the correspondence, and the IP address from the IP address pool is allocated for the first terminal.

If the first-terminal addressing information is the MAC address, the SMF entity may obtain the MAC address of the first terminal in the following manner. The MLAN session establishment request that is sent by the first terminal to the SMF entity using the AMF entity carries the MAC address of the first terminal, such that the SMF entity may obtain the MAC address from the MLAN session establishment request.

Certainly, the SMF entity may alternatively obtain the IP address or the MAC address of the first terminal in another manner. For example, the MAC address of the first terminal is carried in a dynamic host configuration protocol (DHCP) procedure, or the IP address of the first terminal is allocated in the DHCP procedure. This is not specifically limited in this embodiment of this application.

S406a. The first UPF entity establishes a correspondence between the identity of the MLAN to which the first terminal subscribes and information about an uplink path corresponding to the first terminal, and a correspondence between the identity of the MLAN to which the first terminal subscribes and path information of the first UPF entity.

Optionally, in this embodiment of this application, the information about the uplink path corresponding to the first terminal may be allocated by the SMF entity, or may be allocated by the first UPF entity. This is not specifically limited in this embodiment of this application. If the information about the uplink path corresponding to the first terminal is allocated by the SMF entity the N4 session message 1 in step S405a may further carry the information about the uplink path corresponding to the first terminal. A general description is provided herein, and details are not described below again.

For ease of description, in this embodiment of this application, the correspondence between the identity of the MLAN to which the first terminal subscribes and the information about the uplink path corresponding to the first terminal may be denoted as a correspondence 1. A general description is provided herein, and details are not described below again. The correspondence 1 may be shown in Table 1.

TABLE 1

| Identity of the MLAN to which the first terminal subscribes | Information about the uplink path corresponding to the first terminal |
| --- | --- |

Optionally, in this embodiment of this application, the path information of the first UPF entity may be allocated by the SMF entity, or may be allocated by the first UPF entity. This is not specifically limited in this embodiment of this application. If the path information of the first UPF entity is allocated by the SMF entity, the N4 session message 1 in step S405a may further carry the path information of the first UPF entity. A general description is provided herein, and details are not described below again.

For ease of description, in this embodiment of this application, the correspondence between the identity of the MLAN to which the first terminal subscribes and the path information of the first UPF entity may be denoted as a correspondence 2. A general description is provided herein, and details are not described below again. The correspondence 2 may be shown in Table 2.

TABLE 2

| Identity of the MLAN to which the first terminal subscribes | Path information of the first UPF entity |
| --- | --- |

Optionally, the correspondence 1 and the correspondence 2 may be established by the SMF entity and then sent to the first UPF entity. This is not specifically limited in this embodiment of this application.

Optionally, in this embodiment of this application, an N9 tunnel between the first UPF entity and a second UPF entity may be established before the MLAN session is established, or may be established in a process of establishing the MLAN session. This is not specifically limited in this embodiment of this application.

S407a. The first UPF entity sends information about the uplink path corresponding to the first terminal to a first AN device, such that the first AN device receives the information about the uplink path corresponding to the first terminal from the first UPF entity.

S408a. The first AN device sends information about a downlink path corresponding to the first terminal to the first UPF entity, such that the first UPF entity receives the information about, the downlink path corresponding to the first terminal from the first AN device.

Optionally, in this embodiment of this application, the information about the downlink path corresponding to the first terminal may be allocated by the SMF entity, or may be allocated by the first AN device. This is not specifically limited in this embodiment of this application.

S409a. The first UPF entity establishes a correspondence between the identity of the MLAN to which the first terminal subscribes, the information about the downlink path corresponding to the first terminal, and the first-terminal addressing information.

For ease of description, in this embodiment of this application, the correspondence between the identity of the MLAN to which the first terminal subscribes, the information about the downlink path corresponding to the first terminal, and the first-terminal addressing information may be denoted as a correspondence 3. A general description is provided herein, and details are not described below again. The correspondence 3 may be shown in Table 3.

TABLE 3

| Identity of the MLAN to which the first terminal subscribes | Information about the downlink path corresponding to the first terminal | First-terminal addressing information |
| --- | --- | --- |

Optionally, the correspondence 3 may be established by the SMF entity and then sent to the first UPF entity. This is not specifically limited in this embodiment of this application.

S410a. The SMF entity sends an N4 session message 2 to the second UPF entity, such that the second UPF entity receives the N4 session message 2 from the SMF entity, where the N4 session message 2 carries the identity of the MLAN to which the first terminal subscribes, the first-terminal addressing information, and the path information of the first UPF entity.

To be more specific, in this embodiment of this application, in the process of establishing the MLAN session, if the SMF entity determines that there is a cross-UPF entity scenario in the current MLAN, for example, if the MLAN to which the first terminal subscribes includes not only the first UPF entity, but also includes the second UPF entity, the SMF entity may establish the N9 tunnel between the first UPF entity and the second UPF entity.

It should be noted that in this embodiment of this application, the N9 tunnel between the first UPF entity and the second UPF entity is based on an MLAN granularity and is irrelevant to a terminal. In other words, any two UPFs in the same MILAN share one tunnel.

S411. The second UPF entity establishes a correspondence between the identity of the MLAN to which the first terminal subscribes, the first-terminal addressing information, and the path information of the first UPF entity.

For ease of description, in this embodiment of this application, the correspondence between the identity of the MLAN to which the first terminal subscribes, the first-terminal addressing information, and the path information of the first UPF entity may be denoted as a correspondence 4. A general description is provided herein, and details are not described below again. The correspondence 4 may be shown in Table 4.

TABLE 4

| Identity of the MLAN to which the first terminal subscribes | Path information of the first UPF entity | First-terminal addressing information |
| --- | --- | --- |

Optionally, the correspondence 4 may be established by the SMF entity and then sent to the second UPF entity. This is not specifically limited in this embodiment of this application.

Optionally, in this embodiment of this application, the N9 tunnel between the first UPF entity and the second UPF entity may be established before the MLAN session is established, or may be established in the process of establishing the session. This is not specifically limited in this embodiment of this application.

Steps S401b to S411b are similar to steps S401a to S411a. Differences lie in steps S401b to S411b, the first terminal in steps S401a to S409a is replaced with a second terminal, the first AN device in steps S401a to S409a is replaced with a second AN device, and the first UPF entity in steps S401a to S409a is replaced with the second UPF entity. For details, refer to steps S401a to S411a. Details are not described herein again.

In step S406b, the second UPF entity establishes a correspondence between the identity of the MLAN to which the second terminal subscribes, and information about an uplink path corresponding to the second terminal, and the correspondence may be denoted as a correspondence 5. A general description is provided herein, and details are not described below again. The correspondence 5 may be shown in Table 5.

TABLE 5

| Identity of the MLAN to which the second terminal subscribes | Information about the uplink path corresponding to the second terminal |
|---|---|

In step S406b, the second UPF entity establishes a correspondence between the identity of the MLAN to which the second terminal subscribes and path information of the second UPF entity and the correspondence may be denoted as a correspondence 6. A general description is provided herein, and details are not described below again. The correspondence 6 may be shown in Table 6.

TABLE 6

| Identity of the MLAN to which the second terminal subscribes | Path information of the second UPF entity |
|---|---|

In step S409b, the second UPF entity establishes a correspondence between the identity of the MLAN to which the second terminal subscribes, information about a downlink path corresponding to the second terminal, and addressing information of a second terminal, and the correspondence may be denoted as a correspondence 7. A general description is provided herein, and details are not described below again. The correspondence 7 may be shown in Table 7.

TABLE 7

| Identity of the MLAN to which the second terminal subscribes | Information about the downlink path corresponding to the second terminal | Addressing information of a second terminal |
|---|---|---|

In step S411b, the first UPF entity establishes a correspondence between the identity of the MLAN to which the second terminal subscribes, the path information of the second UPF entity, and the addressing information of the second terminal, and the correspondence may be denoted as a correspondence 8. A general description is provided herein, and details are not described below again. The correspondence 8 may be shown in Table 8.

TABLE 8

| Identity of the MLAN to which the second terminal subscribes | Path information of the second UPF entity | Addressing information of the second terminal |
|---|---|---|

Optionally, the correspondence 5, the correspondence 6, and the correspondence 7 may be established by the SMF entity and then sent to the second UPF entity. This is not specifically limited in this embodiment of this application.

Optionally, the correspondence 8 may be established by the SMF entity and then sent to the first UPF entity. This is not specifically limited in this embodiment of this application.

Optionally, in this embodiment of this application, the N9 tunnel between the first UPF entity and the second UPF entity may be established before the MLAN session is established, or may be dynamically established in the process of establishing the MLAN session. This is not specifically limited in this embodiment of this application.

Optionally, to save a storage resource, Table 1, Table 2, Table 3, and Table 8 may be combined, Table 4 to Table 7 may be combined, and combination results are shown in Table 9 and Table 10, respectively.

TABLE 9

| Identity of the MLAN to which the first terminal subscribes | Information about the uplink path corresponding to the first terminal | Information about the downlink path corresponding to the first terminal | First-terminal addressing information | Path information of the first UPF entity | Path information of the second UPF entity |
|---|---|---|---|---|---|

TABLE 10

| Identity of the MLAN to which the second terminal subscribes | Information about the uplink path corresponding to the second terminal | Information about the downlink path corresponding to the second terminal | Addressing information of the second terminal | Path information of the second UPF entity | Path information of the first UPF entity |
|---|---|---|---|---|---|

Optionally, if the identity of the MLAN to which the first terminal subscribes is the same as the identity of the MLAN to which the second terminal subscribes, Table 9 and Table 10 may be combined to further save the resource, and a result is shown in Table 11.

TABLE 11

| Identity of an MLAN | Information about an uplink path | Information about a downlink path | Addressing information | Path information of a UPF entity | Path information of a UPF entity |
|---|---|---|---|---|---|
| Identity of the MLAN to which the first terminal/ second terminal subscribes | Information about the uplink path corresponding to the first terminal | Information about the downlink path corresponding to the first terminal | First-terminal addressing information | Path information of the second UPF entity | Path information of the first UPF entity |
| | Information about the uplink path corresponding to the second terminal | Information about the downlink path corresponding to the second terminal | Addressing information of the second terminal | Path information of the second UPF entity | Path information of the first UPF entity |

To be more specific, when the identity of the MLAN to which a plurality of terminals subscribe is the same, the identity of the MLAN may be recorded as common information. For example, an established correspondence between an identity of an MLAN, information about an uplink path, information about a downlink path, addressing information, and path information of a UPF entity may be shown in Table 12.

Certainly, there may be another combination manner or simplified manner for the foregoing correspondences. This is not specifically limited in this embodiment of this application. Furthermore, in addition to being represented in a table form, the foregoing correspondences may be represented in another form, for example, in a text form or a session context form. This is not specifically limited in this embodiment of this application.

It should be noted that the correspondence between a terminal and a UPF entity in Table 12 is merely used as an example for description. For example, a terminal 1 may be further served by a UPF entity 6. This is not specifically limited in this embodiment of this application.

TABLE 12

| Identity of an MLAN | Information about an uplink path | Information about a downlink path | Addressing information | Path information of a UPF entity | Path information of a UPF entity |
|---|---|---|---|---|---|
| a | Information about an uplink path corresponding to a first terminal | Information about a downlink path corresponding to the first terminal | First-terminal addressing information | Path information of a first UPF entity | Path information of a second UPF entity Path information of a third UPF entity |
| | Information about an uplink path corresponding to a second terminal | Information about a downlink path corresponding to the second terminal | Addressing information of a second terminal | Path information of the second UPF entity | Path information of the first UPF entity |
| | Information about an uplink path corresponding to a third terminal | Information about a downlink path corresponding to the third terminal | Third-terminal addressing information | Path information of the third UPF entity | Path information of the first UPF entity |
| | . . . | . . . | . . . | . . . | . . . |
| b | Information about an uplink path corresponding to a fourth terminal | Information about a downlink path corresponding to the fourth terminal | Fourth-terminal addressing information | Path information of the third UPF entity | Path information of a fourth UPF entity |
| | Information about an uplink path corresponding to a fifth terminal | Information about a downlink path corresponding to the fifth terminal | Fifth-terminal addressing information | Path information of the third UPF entity | Path information of a fifth UPF entity |
| | . . . | . . . | . . . | . . . | . . . |
| . . . | . . . | . . . | . . . | . . . | . . . |

Optionally, for example, the identity of the MLAN to which the first terminal subscribes is the same as the identity of the MLAN to which the second terminal subscribes, and the first terminal sends a data packet 1 to the second terminal. In this case, the data transmission method provided in this embodiment of this application further includes the following steps S412 to S418.

S412. The first terminal sends the data packet 1 to the first UPF entity through the uplink path corresponding to the first terminal, such that the first UPF entity receives the data packet 1 from the first terminal through the uplink path corresponding to the first terminal, where the data packet 1 carries the addressing information of the second terminal, and the addressing information of the second terminal is used as destination addressing information.

Optionally, the data packet 1 may further carry the first-terminal addressing information that is used as source addressing information. This is not specifically limited in this embodiment of this application.

S413. The first UPF entity determines, based on the information about the uplink path corresponding to the first terminal, the identity of the MLAN to which the first terminal subscribes.

The first UPF entity may determine, based on the information about the uplink path corresponding to the first terminal and the correspondence 1, the identity of the MLAN to which the first terminal subscribes.

For example, the first UPF entity may search Table 1, Table 9, or Table 11 based on the information about the uplink path corresponding to the first terminal to obtain the identity of the MLAN to which the first terminal subscribes.

S414. The first UPF entity determines the path information of the second UPF entity based on the identity of the MLAN to which the first terminal subscribes and the addressing information of the second terminal and with reference to the correspondence 8.

The first UPF entity may determine the path information of the second UPF entity based on the identity of the MLAN to which the first terminal subscribes, the addressing information of the second terminal, and the correspondence 8.

For example, the first UPF entity may search Table 8, Table 9, Table 11, or Table 12 based on the identity of the MLAN to which the first terminal subscribes and the addressing information of the second terminal to obtain the path information of the second UPF entity.

Optionally, if the first UPF entity may determine the downlink path corresponding to the second terminal based on the identity of the MLAN to which the first terminal subscribes and the addressing information of the second terminal and with reference to the correspondence 3, it indicates that the first terminal and the second terminal are served by the same UPF entity. In this case, the first UPF entity may send the data packet 1 to the second terminal through the downlink path corresponding to the second terminal. This is not specifically limited in this embodiment of this application.

S415. The first UPF entity sends the data packet 1 to the second UPF entity based on the path information of the second UPF entity, such that the second UPF entity receives the data packet 1 from the first UPF entity.

S416. The second UPF entity determines, based on the path information of the second UPF entity, the identity of the MLAN to which the second terminal subscribes.

The second UPF entity may determine, based on the path information of the second UPF entity and the correspondence 6, the identity of the MLAN to which the second terminal subscribes.

For example, the second UPF entity may search Table 6, Table 10, Table 11, or Table 12 based on the path information of the second UPF entity to obtain the identity of the MLAN to which the second terminal subscribes.

S417. The second UPF entity determines, based on the identity of the to which the second terminal subscribes and the addressing information of the second terminal, the downlink path corresponding to the second terminal.

The second INF entity may determine, based on the identity of the MLAN to which the second terminal subscribes, the addressing information of the second terminal, and the correspondence 7, the downlink path corresponding to the second terminal.

For example, the second UPF entity may search Table 7, Table 10, Table 11, or Table 12 based on the identity of the MLAN to which the second terminal subscribes and the addressing information of the second terminal to determine the downlink path corresponding to the second terminal.

S418. The second UT entity sends the data packet 1 to the second terminal through the downlink path corresponding to the second terminal.

Optionally, in this embodiment of this application, the destination addressing information carried in the data packet 1 may be broadcast address information. After detecting that the destination addressing information is the broadcast address information, the first UPF entity or the SMF entity may replace the broadcast address with addressing information corresponding to all other terminals different from the first terminal in the MLAN to which the first terminal subscribes, further determine, based on the identity of the MLAN and addressing information corresponding to a corresponding terminal, a downlink path corresponding to the corresponding terminal in the foregoing manner, and send the data packet 1 to the corresponding terminal through the downlink path corresponding to the corresponding terminal. This is not specifically limited in this embodiment of this application.

Optionally, for example, the identity of the MLAN to which the first terminal subscribes is the same as the identity of the MLAN to which the second terminal subscribes, and the second terminal sends a data packet 2 to the first terminal. In this case, the data transmission method provided in this embodiment of this application further includes the following steps S419 to S425.

S419. The second terminal sends the data packet 2 to the second UPF entity through the uplink path corresponding to the second terminal, such that the second UPF entity receives the data packet 2 from the first terminal through the uplink path corresponding to the second terminal, where the data packet 2 carries the addressing information of the second terminal, and the addressing information of the second terminal is used as destination addressing information.

Optionally, the data packet 2 may further carry the addressing information of the second terminal that is used as source addressing information. This is not specifically limited in this embodiment of this application.

S420. The second UPF entity determines, based on the information about the uplink path corresponding to the second terminal, the identity of the MLAN to which the second terminal subscribes.

The second UPF entity may determine, based on the information about the uplink path corresponding to the second terminal and the correspondence 5, the identity of the MLAN to which the second terminal subscribes.

For example, the second UPF entity may search Table 5, Table 10, Table 11, or Table 12 based on the information about the uplink path corresponding to the second terminal to obtain the identity of the ULAN to which the first terminal subscribes.

S421. The second UPF entity determines the path information of the first UPF entity based on the identity of the MLAN to which the second terminal subscribes and the first-terminal addressing information and with reference to the correspondence 4.

The second UPF entity may determine the path information of the first UPF entity based on the identity of the MLAN to which the second terminal subscribes, the first-terminal addressing information, and the correspondence 4.

For example, the second UPF entity may search Table 4, Table 10, Table 11, or Table 12 based on the identity of the MLAN to which the second terminal subscribes and the first-terminal addressing information to obtain the path information of the first UPF entity.

Optionally, if the second UPF entity may determine, based on the identity of the MLAN to which the second terminal subscribes and the first-terminal addressing information and with reference to the correspondence 7, the downlink path corresponding to the first terminal, it indicates that the first terminal and the second terminal are served by the same UPF entity. In this case, the second UPF entity may send the data packet 2 to the first terminal through the downlink path corresponding to the first terminal. This is not specifically limited in this embodiment of this application.

S422. The second. UPF entity sends the data packet 2 to the first UPF entity based on the path information of the first UPF entity, such that the first UPF entity receives the data packet 2 from the second UPF entity.

S423. The first UPF entity determines, based on the path information of the first UPF entity, the identity of the MLAN to which the first terminal subscribes.

The first UPF entity may determine, based on the path information of the first UPF entity and the correspondence 2, the identity of the MLAN to which the first terminal subscribes.

For example, the first UPF entity may search Table 2, Table 9, or Table 11 based on the path information of the first UPF entity to obtain the identity of the MLAN to which the first terminal subscribes.

S424. The first UPF entity determines, based on the identity of the MLAN to which the first terminal subscribes and the first-terminal addressing information, the downlink path corresponding to the first terminal.

The first UPF entity may determine, based on the identity of the MLAN to which the first terminal subscribes, the first-terminal addressing information, and the correspondence 3, the downlink path corresponding to the first terminal.

For example, the first UPF entity may search Table 3, Table 9, Table 11, or Table 12 based on the identity of the MLAN to which the first terminal subscribes and the first-terminal addressing information to determine the downlink path corresponding to the first terminal.

S425. The first UPF entity sends the data packet 2 to the first terminal through the downlink path corresponding to the first terminal.

Optionally, in this embodiment of this application, the destination addressing information carried in the data packet 2 may be broadcast address information. After detecting that the destination addressing information is the broadcast address information, the second UPF entity or the SMF entity may replace the broadcast address with addressing information corresponding to all other terminals different from the second terminal in the MLAN to which the second terminal subscribes, further determine, based on the identity of the MLAN and addressing information corresponding to a corresponding terminal, a downlink path corresponding to the corresponding terminal in the foregoing manner, and send the data packet 2 to the corresponding terminal through the downlink path corresponding to the corresponding terminal. This is not specifically limited in this embodiment of this application.

Based on the data transmission method provided in this embodiment of this application, after receiving the data packet from the first terminal through the uplink path corresponding to the first terminal, the first UPF entity may determine the path information of the second UPF entity based on the information about the uplink path corresponding to the first terminal and the addressing information of the second terminal, and may further send the data packet to the second UPF entity based on the path information of the second UPF entity; and the second UPF entity sends the data packet to the second terminal through the downlink path corresponding to the second terminal. Alternatively, after receiving the data packet from the second terminal through the uplink path corresponding to the second terminal, the second UPF entity may determine the path information of the first UPF entity based on the information about the uplink path corresponding to the second terminal and the first-terminal addressing information, and may further send the data packet to the first INF entity based on the path information of the first UPF entity; and the first UPF entity sends the data packet to the first terminal through the downlink path corresponding to the first terminal. In this way, local interaction can be implemented between the two terminals when the two terminals are served by different UPF entities. For example, local interaction between the two terminals that access the same MLAN can be implemented in the MLAN when the two terminals are served by different UPF entities.

The actions of the first UPF entity and the second UPF entity in steps S401a to S425 may be performed by the processor 301 in the communications device 300 shown in FIG. 3 by invoking the application program code stored in the memory 303. This is not limited in this embodiment of this application.

Optionally, for example, the data transmission system shown in FIG. 1 is applied to the 5G network shown in FIG. 2. For the scenario 1, another data transmission method provided in an embodiment of this application may be shown in FIG. 5A to FIG. 5C, and includes the following steps.

Steps S501a to S509a are the same as steps S401a to S409a. For details, refer to the embodiment shown in FIG. 4A. Details are not described herein again.

Steps S501b to S509b are the same as steps S401b to S409b. For details, refer to the embodiment shown in FIG. 4B. Details are not described herein again.

Steps S510 and S511 are the same as steps S412 and S413. For details, refer to the embodiment shown in FIG. 4C. Details are not described herein again.

S512. The first UPF entity sends an N4 session message 2 to the SMF entity, such that the SMF entity receives the N4 session message 2 from the first UPF entity, where the N4 session message 2 carries the identity of the MLAN to which the first terminal subscribes and the addressing information of the second terminal, and the N4 session message 2 is used to request path information of the UPF entity that serves the second terminal.

Optionally, if the first UPF entity may determine, based on the identity of the MLAN to which the first terminal subscribes and the addressing information of the second terminal and with reference to the correspondence 3, the downlink path corresponding to the second terminal, it indicates that the first terminal and the second terminal are served by the same UPF entity. In this case, the first UPF entity may send the data packet 1 to the second terminal through the downlink path corresponding to the second terminal. This is not specifically limited in this embodiment of this application.

S513. The SMF entity sends an N4 session message 3 to the first UPF entity, such that the first UPF entity receives the N4 session message 2 from the SMF entity where the N4 session message 2 carries the path information of the second UPF entity that serves the second terminal.

S514. The first UPF entity establishes the correspondence 8.

Figure 4A:
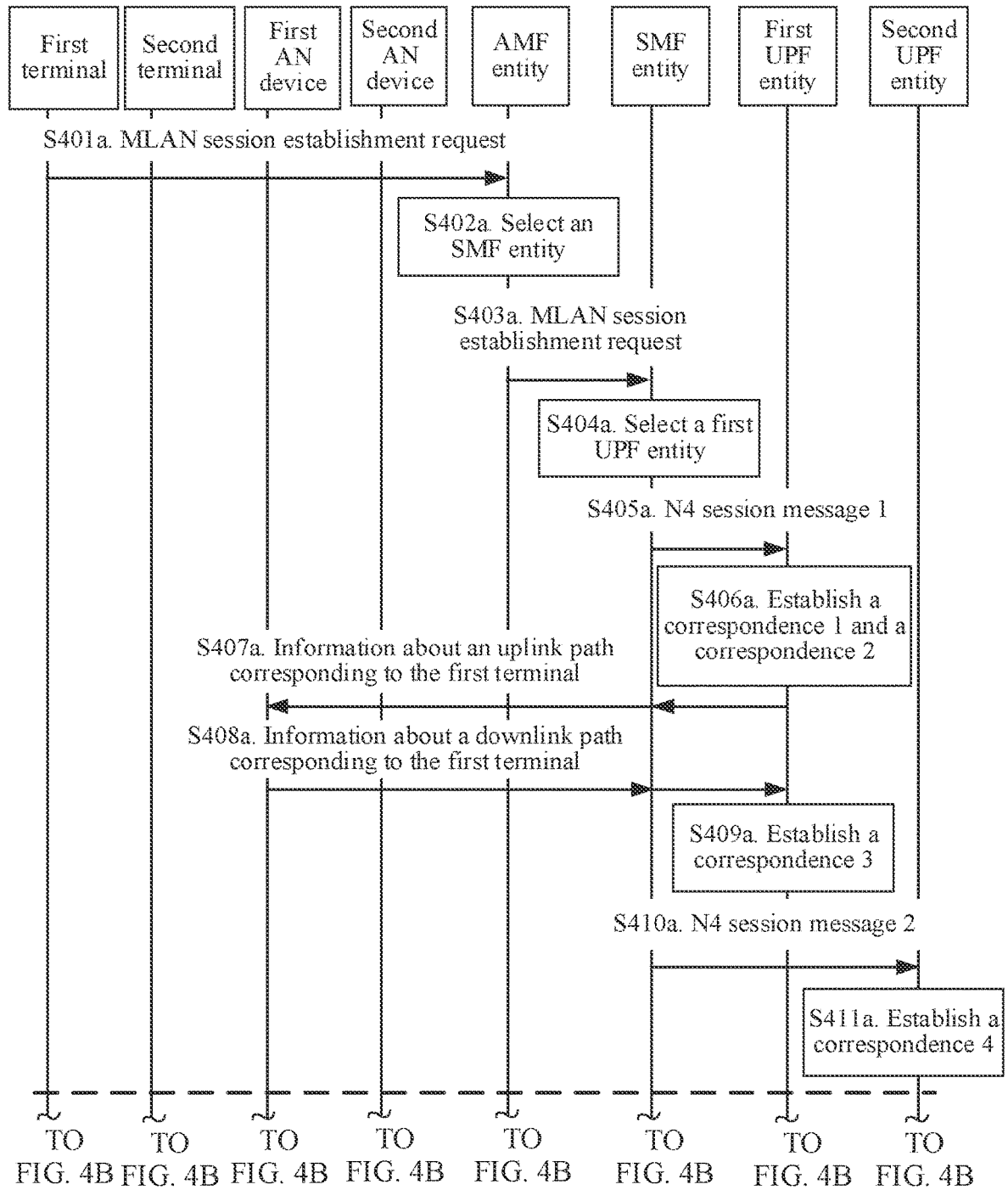
FIG. 4A, FIG. 4B, and FIG. 4C are a schematic flowchart 1 of a data transmission method according to an embodiment of this application.
Figure 4B:
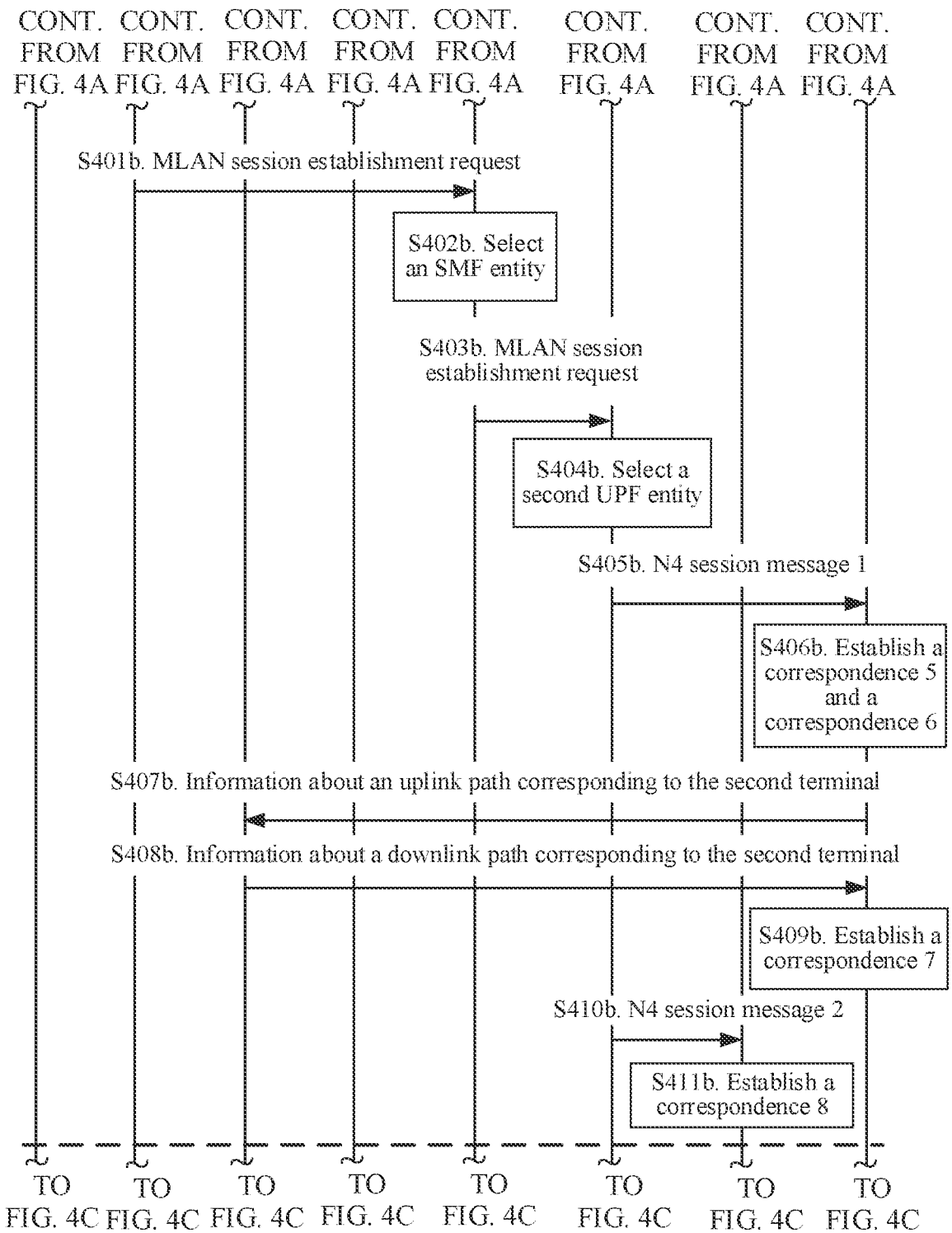

For related descriptions of the correspondence 8, refer to the embodiment shown in FIG. 4B. Details are not described herein again.

Steps S515 to S518 are the same as steps S415 to S418. For details, refer to the embodiment shown in FIG. 4C. Details are not described herein again.

Steps S519 and S520 are the same as steps S419 and S420. For details, refer to the embodiment shown in FIG. 4C. Details are not described herein again.

S521. The second UPF entity sends an N4 session message 4 to the SMF entity, such that the SMF entity receives the N4 session message 4 from the second UPF entity, where the N4 session message 4 carries the identity of the MLAN to which the second terminal subscribes, and the first-terminal addressing information, and the N4 session message 4 is used to request path information of the UPF entity that serves the first terminal.

Optionally, if the second UPF entity may determine, based on the identity of the MLAN to which the second terminal subscribes and the first-terminal addressing information, and with reference to the correspondence 7, the downlink path corresponding to the first terminal, it indicates that the first terminal and the second terminal are served by the same UPF entity. In this case, the second UPF entity may send the data packet 2 to the first terminal through the downlink path corresponding to the first terminal. This is not specifically limited in this embodiment of this application.

S522. The SMF entity sends an N4 session message 5 to the second UPF entity, such that the second UPF entity receives the N4 session message 5 from the SMF entity, where the N4 session message 5 carries the path information of the first UPF entity.

S523. The second UPF entity establishes the correspondence 4.

For related descriptions of the correspondence 4, refer to the embodiment shown in FIG. 4A. Details are not described herein again.

Steps S524 to S527 are the same as steps S422 to S425. For details, refer to the embodiment shown in FIG. 4C. Details are not described herein again.

Figure 4C:
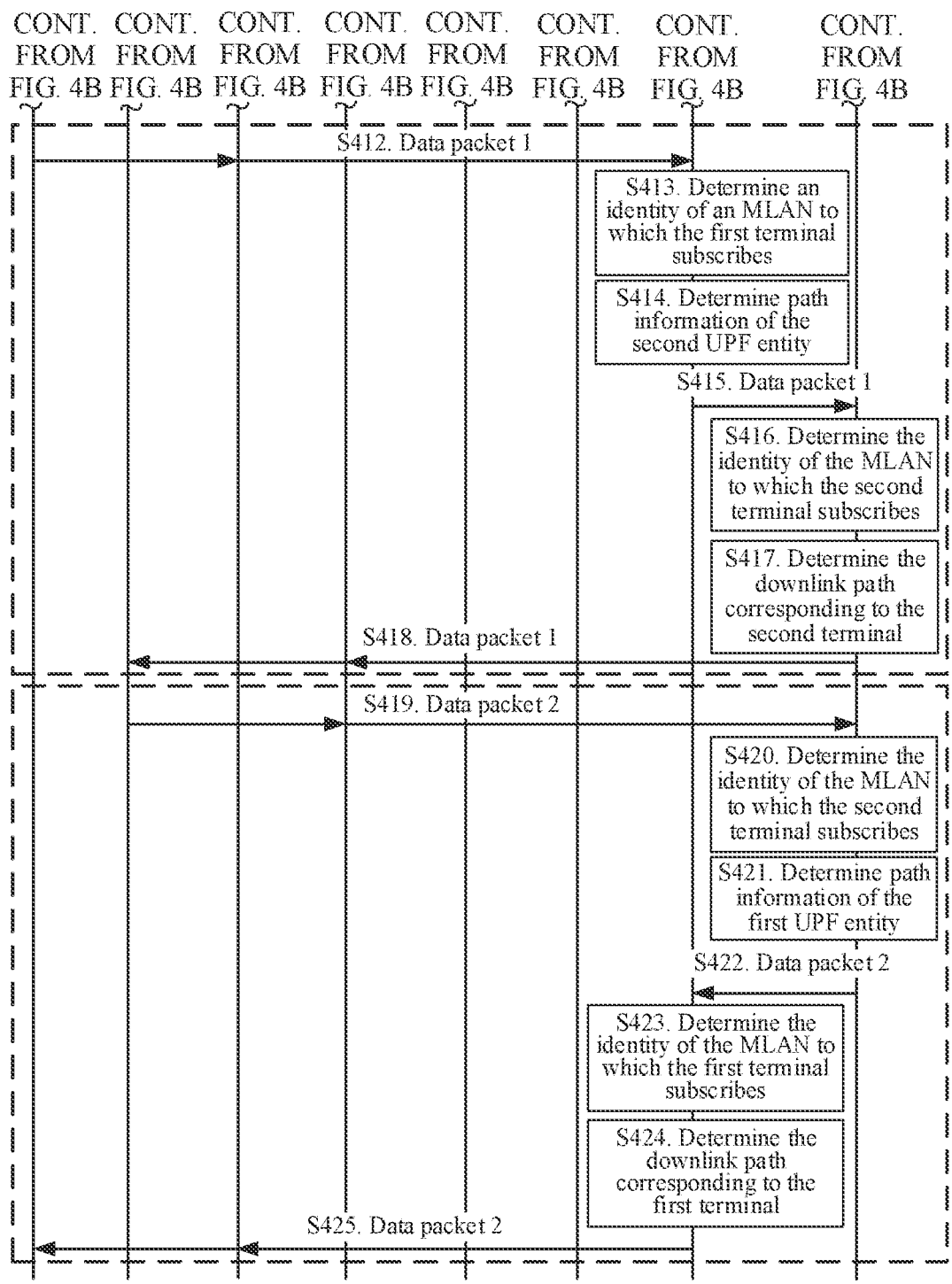
Figure 5A:
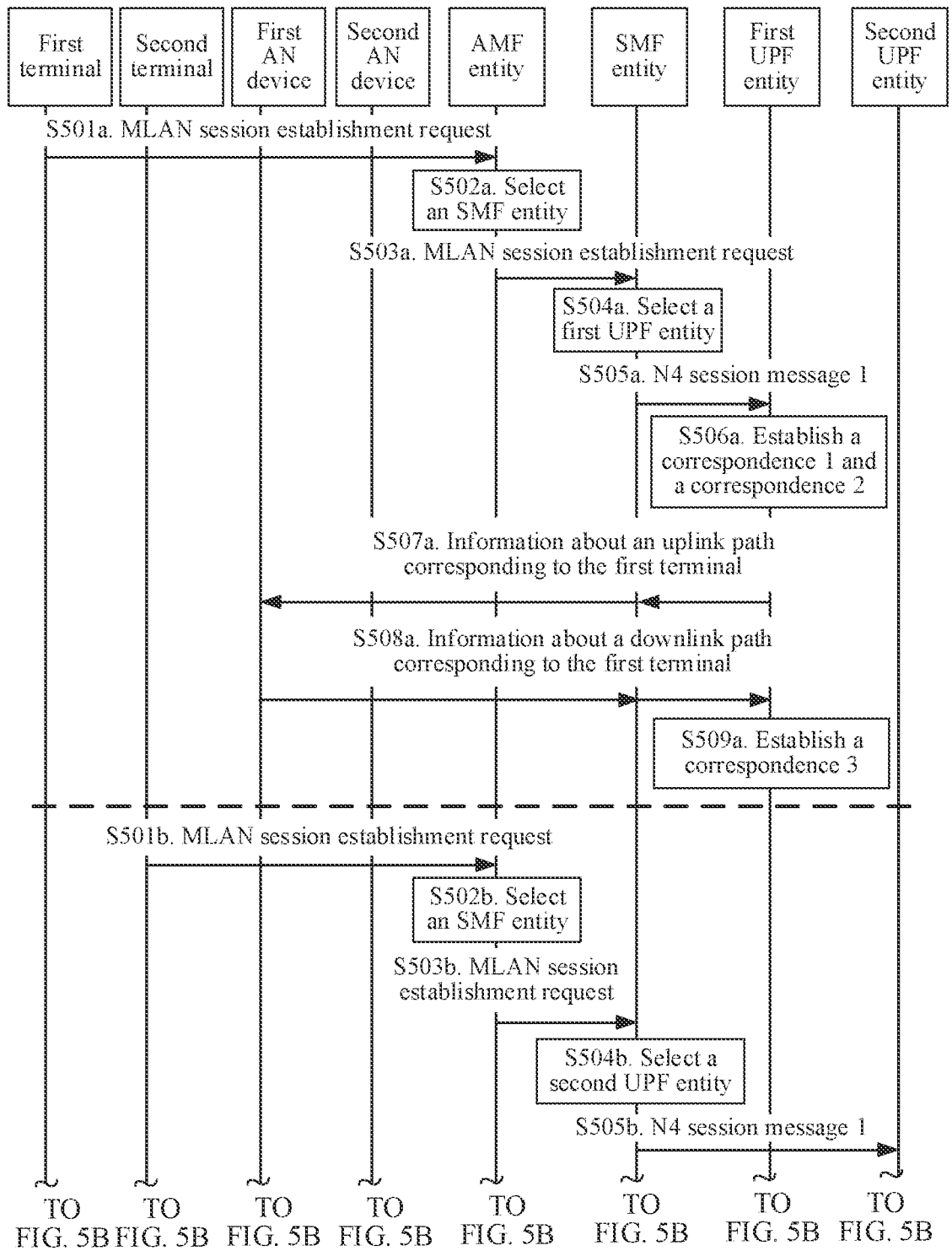
FIG. 5A, FIG. 5B, and FIG. 5C are a schematic flowchart 2 of a data transmission method according to an embodiment of this application.
Figure 5B:
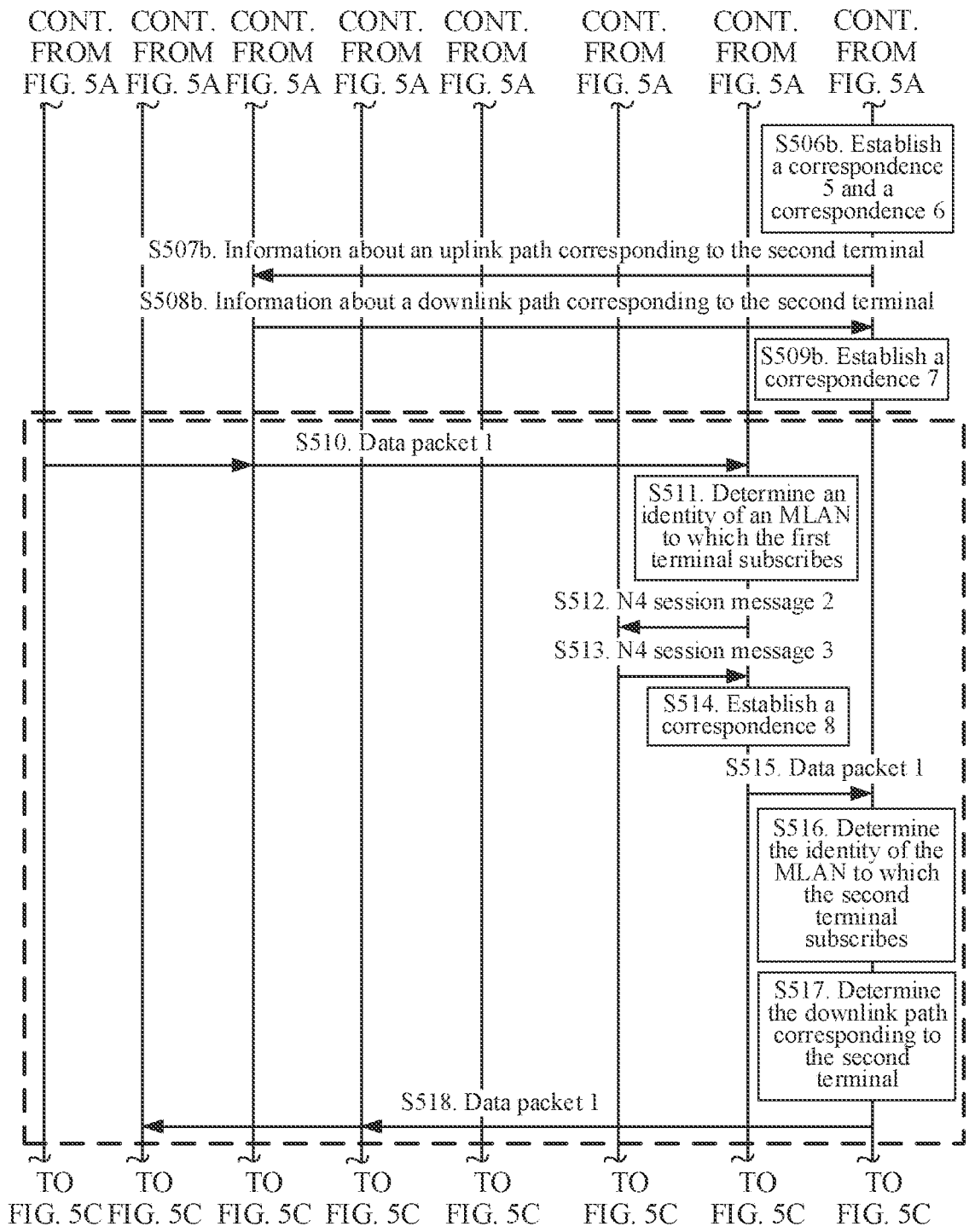
Figure 5C:
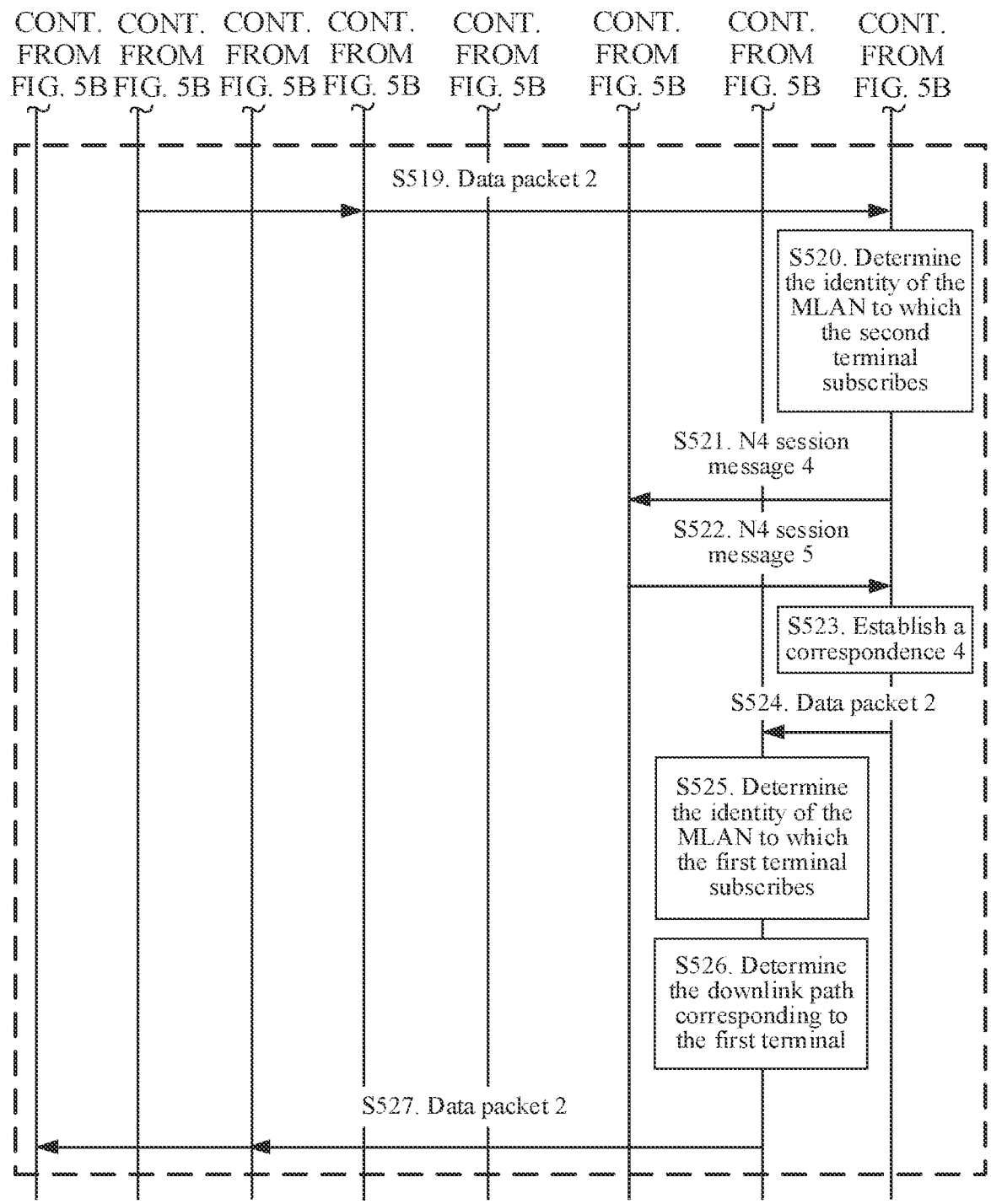

A difference between this embodiment shown in FIG. 5A to FIG. 5C and the embodiment shown in FIG. 4A to FIG. 4C lies in the embodiment shown in FIG. 4A to FIG. 4C, in the process of establishing an MLAN session, the SMF entity pre-synchronizes path information of a UPF entity to another UPF entity in the same MLAN; however, in this embodiment shown in FIG. 5A to FIG. 5C, during communication between the terminals, after receiving a request that is sent by the first UPF entity and that is used for requesting the path information of the second UPF entity, the SMF entity synchronizes the path information of the second UPF entity to the first UPF entity.

Optionally, in the embodiment shown in FIG. 5A to FIG. 5C, an N9 tunnel between the first UPF entity and the second UPF entity may be pre-established before data transmission, or may be dynamically established during the data transmission. This is not specifically limited in this embodiment of this application.

Based on the data transmission method provided in this embodiment of this application, local interaction between the two terminals can be implemented when the two terminals are served by different UPF entities. For example, local interaction between the two terminals that access the same MLAN can be implemented in the MLAN when the two terminals are served by different UPF entities.

The actions of the first UPF entity and the second UPF entity in steps S501a to S527 may be performed by the processor 301 in the communications device 300 shown in FIG. 3 by invoking the application program code stored in the memory 303. This is not limited in this embodiment of this application.

Optionally, for example, the data transmission system shown in FIG. 1 is applied to the 5G network shown in FIG. 2. For the scenario 2, a data transmission method provided in an embodiment of this application may be shown in FIG. 6A to FIG. 6C, and includes the following steps.

S601. A second terminal moves, and is handed over from a first AN device to a second AN device.

For an AN device handover manner, refer to an existing implementation. Details are not described herein.

Before the second terminal moves, both a first terminal and the second terminal are served by a first UPF entity. In this embodiment of this application, when the two terminals that access the same MLAN are served by a same UPF entity a manner of implementing local interaction between the two terminals in the MLAN is not specifically limited. For example, after receiving a data packet from the first terminal through an uplink path corresponding to the first terminal, the first UPF entity may determine, based on addressing information of a second terminal carried in the data packet and information about the uplink path corresponding to the first terminal, information about a downlink path corresponding to the second terminal, and further send the data packet to the second terminal through the downlink path corresponding to the second terminal. This can implement local interaction between the first terminal and the second terminal in the MLAN.

S602. The second AN device sends the information about the downlink path corresponding to the second terminal to the first UPF entity, such that the first UPF entity receives the information about the downlink path corresponding to the second terminal from the second AN device.

Optionally, the information about the downlink path corresponding to the second terminal may be allocated by an SMF entity and then sent to the first UPF entity. This is not specifically limited in this embodiment of this application.

S603. The first UPF entity establishes a correspondence 7.

For related descriptions of the correspondence 7, refer to the embodiment shown in FIG. 4B. Details are not described herein again.

Optionally, the correspondence 7 established in this embodiment of this application may be an updated correspondence 7 established before an AN device handover occurs, or may be a newly established correspondence 7. This is not specifically limited in this embodiment of this application.

If the correspondence 7 is the updated correspondence 7 established before the AN device handover occurs, then before the AN device handover occurs, the information about the downlink path corresponding to the second terminal in the correspondence 7 includes a tunnel identifier of the first AN device allocated for the second terminal. After the AN device handover occurs, the information about the downlink path corresponding to the second terminal in the correspondence 7 includes a tunnel identifier of the second AN device allocated for the second terminal.

S604. The SMF entity selects a second UPF entity.

To be more specific, after the second terminal moves, the SMF entity may reselect a UPF entity after determining that the first UPF entity that currently provides a service is not optimal. Certainly, the SMF entity may reselect a UPF entity for another reason. This is not specifically limited in this embodiment of this application.

For a manner in which the SMF entity selects the second UPF entity, refer to an existing solution. Details are not described herein.

S605. The SMF entity sends an N4 session message 1 to the second UPF entity, such that the second UPF entity receives the N4 session message 1 from the SMF entity, where the N4 session message 1 carries an identity of an MLAN to which the second terminal subscribes, the addressing information of the second terminal, and the information about the downlink path corresponding to the second terminal.

For related descriptions of the addressing information of the second terminal, refer to step S405a. Details are not described herein again.

S606. The second UPF entity establishes a correspondence 5, a correspondence 6, and the correspondence 7.

For related descriptions of the correspondence 5, the correspondence 6, and the correspondence 7, refer to the embodiment shown in FIG. 4B. Details are not described herein again.

The information about the uplink path corresponding to the second terminal in the correspondence 5 may be allocated by the SMF entity, or may be allocated by the second UPF entity. This is not specifically limited in this embodiment of this application. If the information about the uplink path corresponding to the second terminal is allocated by the SMF entity, the N4 session message 1 in step S605 may further carry the information about the uplink path corresponding to the second terminal. A general description is provided herein, and details are not described below again.

Path information of the second UPF entity in the correspondence 6 may be allocated by the SMF entity, or may be allocated by the second UPF entity. This is not specifically limited in this embodiment of this application. If the path information of the second UPF entity is allocated by the SMF entity, the N4 session message 1 in step S605 may further carter the path information of the second UPF entity. A general description is provided herein, and details are not described below again.

S607. The second UPF entity sends the information about the uplink path corresponding to the second terminal to the second AN device, such that the second AN device receives the information about the uplink path corresponding to the second terminal from the second UPF entity.

S608. The SMF entity sends an N4 session message 2 to the first UPF entity, such that the first UPF entity receives the N4 session message 2 from the SMF entity, where the N4 session message 2 carries the identity of the MLAN to which the second terminal subscribes, the addressing information of the second terminal, and the path information of the second UPF entity.

S609. The first UPF entity deletes the correspondence 7, and establishes a correspondence 8.

For related descriptions of the correspondence 7 and the correspondence 8, refer to the embodiment shown in FIG. 4B. Details are not described herein again.

S610. The SMF entity sends an N4 session message 3 to the second UPF entity such that the second UPF entity receives the N4 session message 3 from the SMF entity, where the N4 session message 3 carries the identity of the MLAN to which the first terminal subscribes, first-terminal addressing information, and path information of the first UPF entity.

Optionally, in this embodiment of this application, the N4 session message 1 and the N4 session message 3 may be sent to the second UPF entity using one message, or may be separately sent to the second UPF entity. This is not specifically limited in this embodiment of this application.

S611. The second UPF entity establishes a correspondence 4.

For related descriptions of the correspondence 4, refer to the embodiment shown in FIG. 4A. Details are not described herein again.

S612. The SMF entity sends an N4 session message 6 to the first UPF entity, such that the first UPF entity receives the N4 session message 6 from the SMF entity where the N4 session message 6 carries the identity of the MLAN to which the first terminal subscribes.

S613. The first UPF entity establishes a correspondence 2.

For related descriptions of the correspondence 2, refer to the embodiment shown in FIG. 4A. Details are not described herein again.

Optionally, in this embodiment of this application, the N4 session message 2 and the N4 session message 6 may be sent to the first UPF entity using one message, or may be separately sent to the first UPF entity. This is not specifically limited in this embodiment of this application.

Steps S614 to S627 are the same as steps S412 to S425. For details, refer to the embodiment shown in FIG. 4C. Details are not described herein again.

Figure 6A:
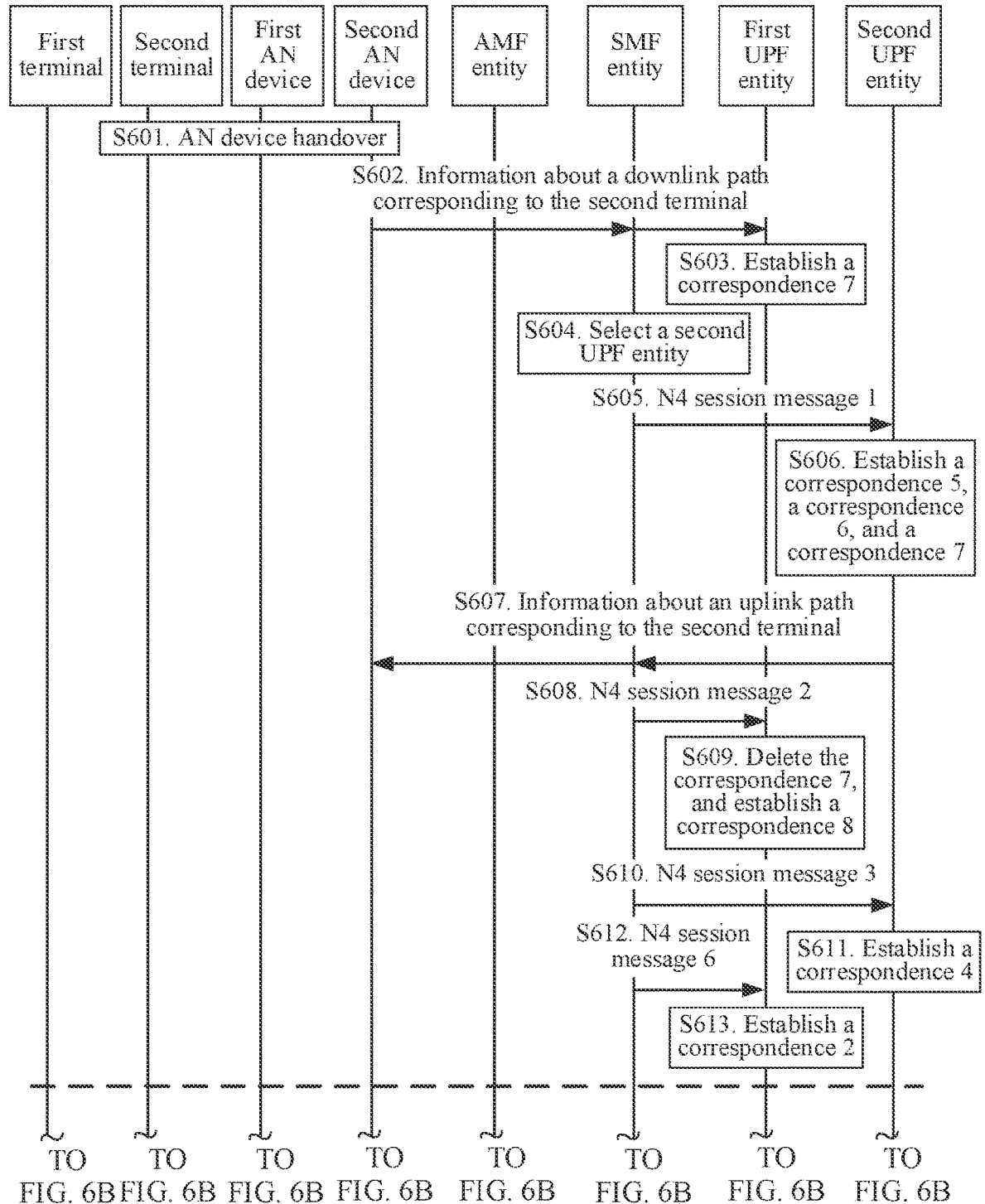
FIG. 6A, FIG. 6B, and FIG. 6C are a schematic flowchart 3 of a data transmission method according to an embodiment of this application.
Figure 6B:
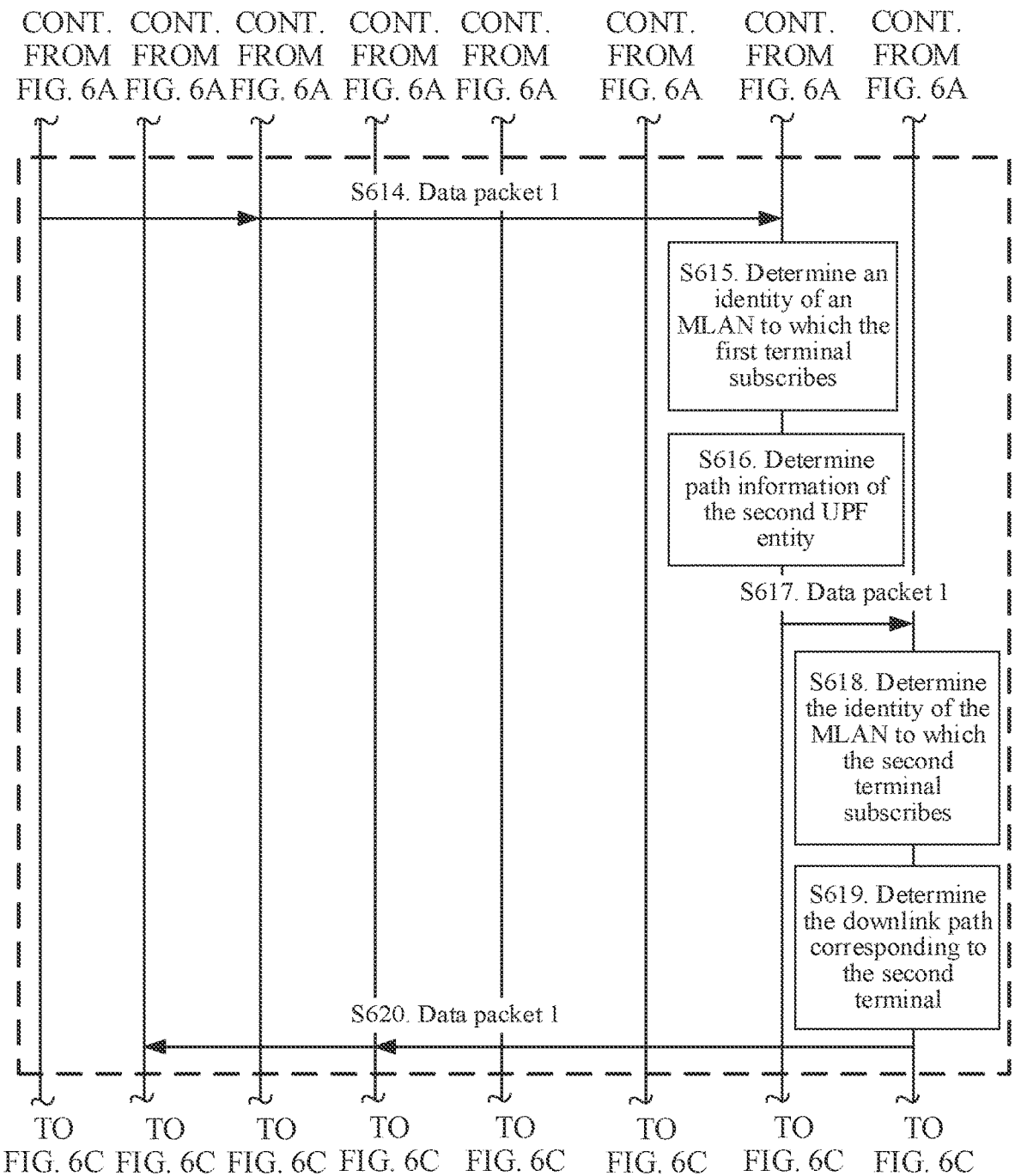
Figure 6C:
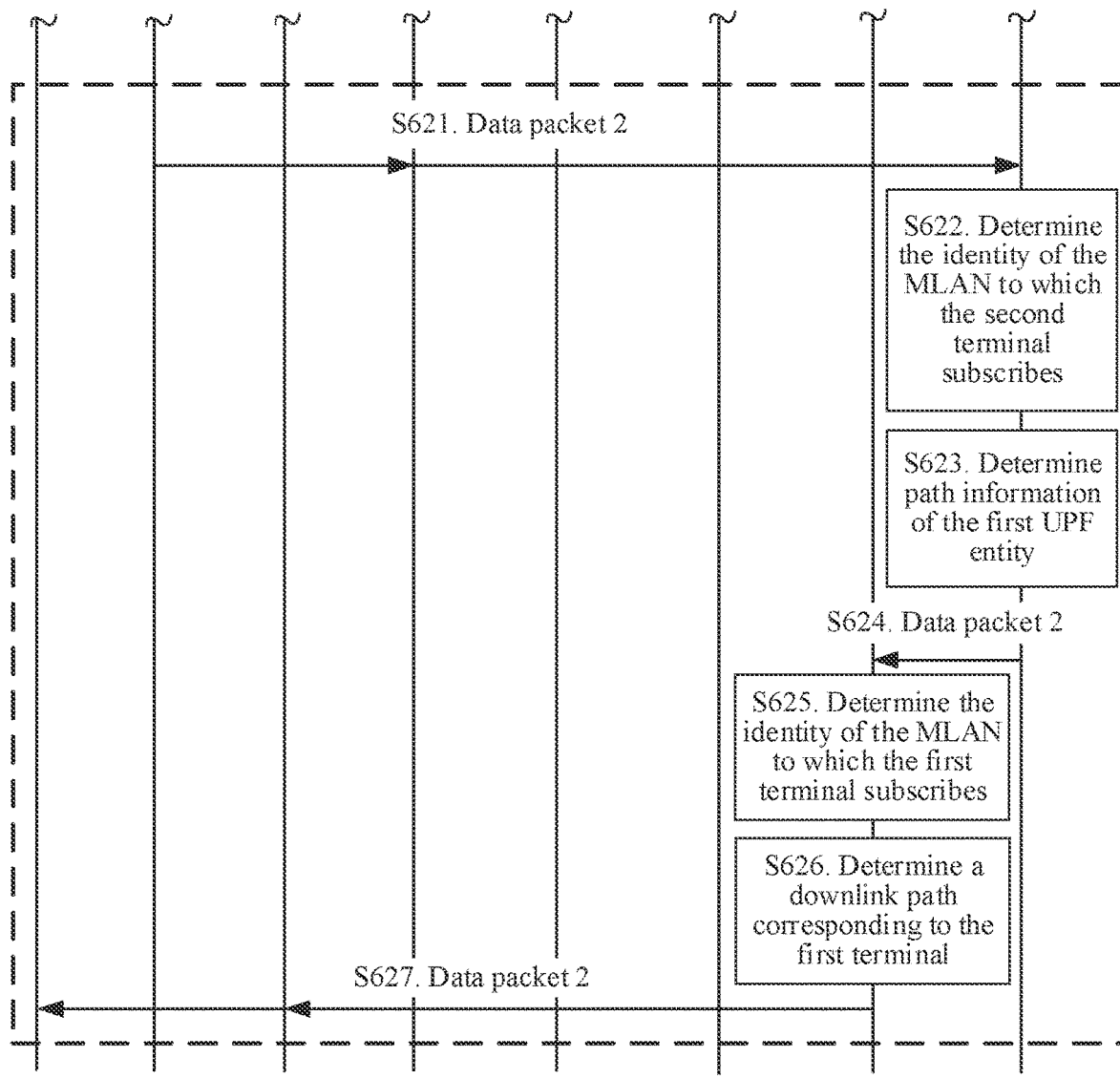

Optionally, in this embodiment shown in FIG. 6A to FIG. 6C, an N9 tunnel between the first UPF entity and the second UPF entity may be pre-established before a UPF handover occurs, or may be dynamically established during the UPF handover. This is not specifically limited in this embodiment of this application.

Based on the data transmission method provided in this embodiment of this application, local interaction between the two terminals that access the same MLAN can be implemented in the MLAN when the two terminals are served by different UPF entities.

The actions of the first UPF entity and the second UPF entity in steps S601 to S627 may be performed by the processor 301 in the communications device 300 shown in FIG. 3 by invoking the application program code stored in the memory 303. This is not limited in this embodiment of this application.

Optionally, for example, the data transmission system shown in FIG. 1 is applied to the 5G network shown in FIG. 2. For the scenario 2, another data transmission method provided in an embodiment of this application may be shown in FIG. 7A to FIG. 7C, and includes the following steps.

Steps S701 to S707 are the same as steps S601 to S607. For details, refer to the embodiment shown in FIG. 6A. Details are not described herein again.

Steps S708 and S709 are the same as steps S612 and S613. For details, refer to the embodiment shown in FIG. 6A. Details are not described herein again.

S710. The first UPF entity deletes the correspondence 7.

For related descriptions of the correspondence 7, refer to the embodiment shown in FIG. 4B. Details are not described herein again.

Steps S711 to S728 are the same as steps S510 to S527. For details, refer to the embodiment shown in FIG. 5B and FIG. 5C. Details are not described herein again.

Figure 7A:
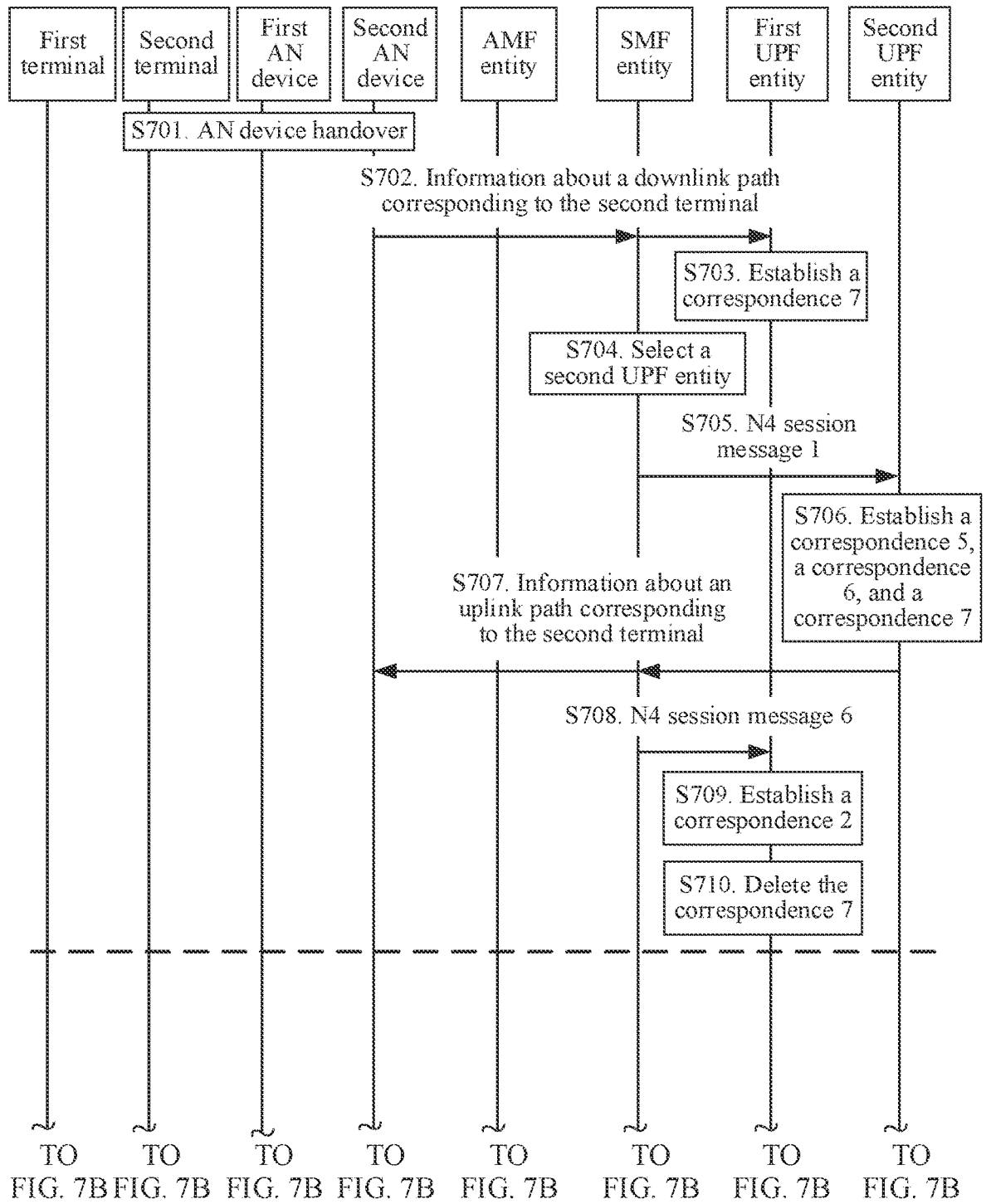
FIG. 7A, FIG. 7B, and FIG. 7C are a schematic flowchart 4 of a data transmission method according to an embodiment of this application.
Figure 7B:
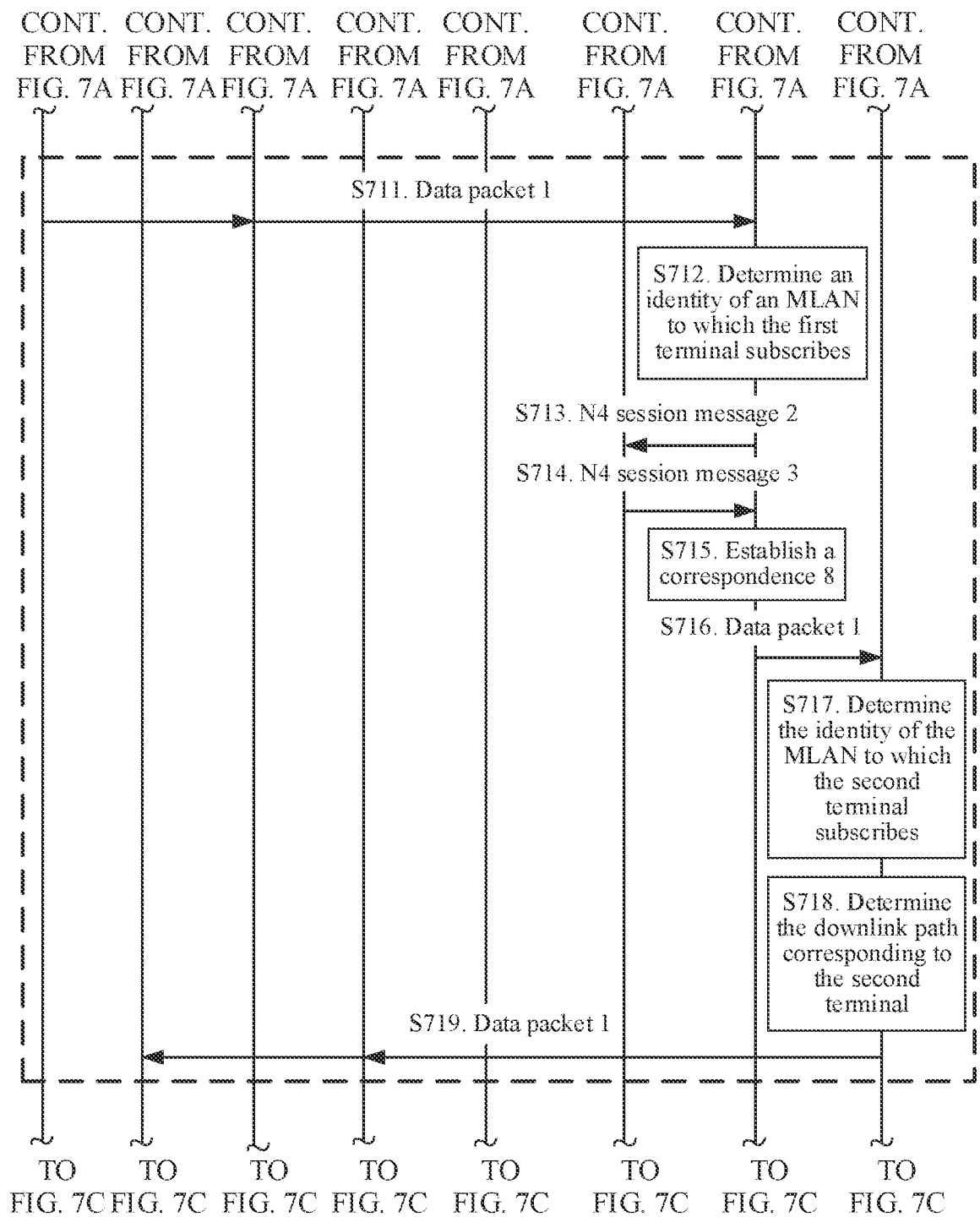
Figure 7C:
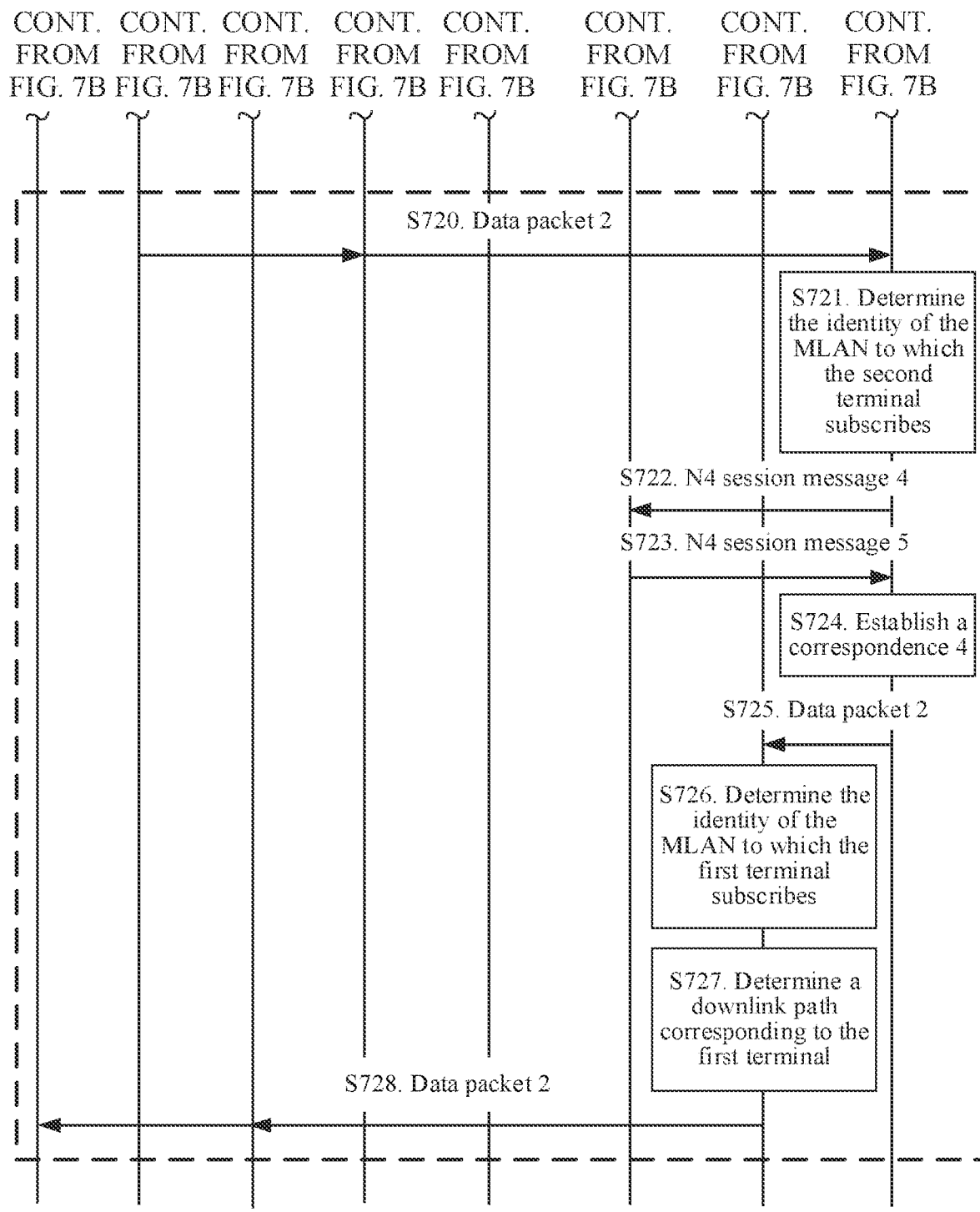

A difference between this embodiment shown in FIG. 7A to FIG. 7C and the embodiment shown in FIG. 6A to FIG. 6C lies in the embodiment shown in FIG. 6A to FIG. 6C, during a UPF entity handover, the SMF entity pre-synchronizes path information of a UPF entity to another UPF entity in the same MLAN; however, in this embodiment shown in FIG. 7A to FIG. 7C, during communication between the terminals, after receiving a request that is sent by the first UPF entity and that is used for requesting the path information of the second UPF entity, the SMF entity synchronizes the path information of the second UPF entity to the first UPF entity.

Based on the data transmission method provided in this embodiment of this application, local interaction between the two terminals can be implemented when the two terminals are served by different UPF entities. For example, local interaction between the two terminals that access the same MLAN can be implemented in the MLAN when the two terminals are served by different UPF entities.

The actions of the first UPF entity and the second UPF entity in steps S501a to S527 may be performed by the processor 301 in the communications device 300 shown in FIG. 3 by invoking the application program code stored in the memory 303. This is not limited in this embodiment of this application.

Optionally, the embodiments shown in FIG. 6A to FIG. 7C are described using an example in which both an AN device handover and the UPF entity handover occur. Certainly, alternatively, only the AN device handover or the UPF entity handover may occur. This is not specifically limited in the embodiments of this application. If only the AN device handover occurs, but the UPF entity handover does not occur, only information about a downlink path corresponding to a corresponding terminal needs to be updated. If only the UPF entity handover occurs, but the AN device handover does not occur, only a related step after the UPF entity handover in FIG. 6A to FIG. 6C or FIG. 7A to FIG. 7C needs to be performed. For details, refer to the embodiments shown in FIG. 6A to FIG. 7C. Details are not described in this embodiment of this application again.

Optionally, in the embodiment shown in FIG. 7A to FIG. 7C, an N9 tunnel between the first UPF entity and the second UPF entity may be pre-established before the UPF handover occurs, may be dynamically established during the UPF handover, or may be dynamically established during data transmission. This is not specifically limited in this embodiment of this application.

Figure 8:
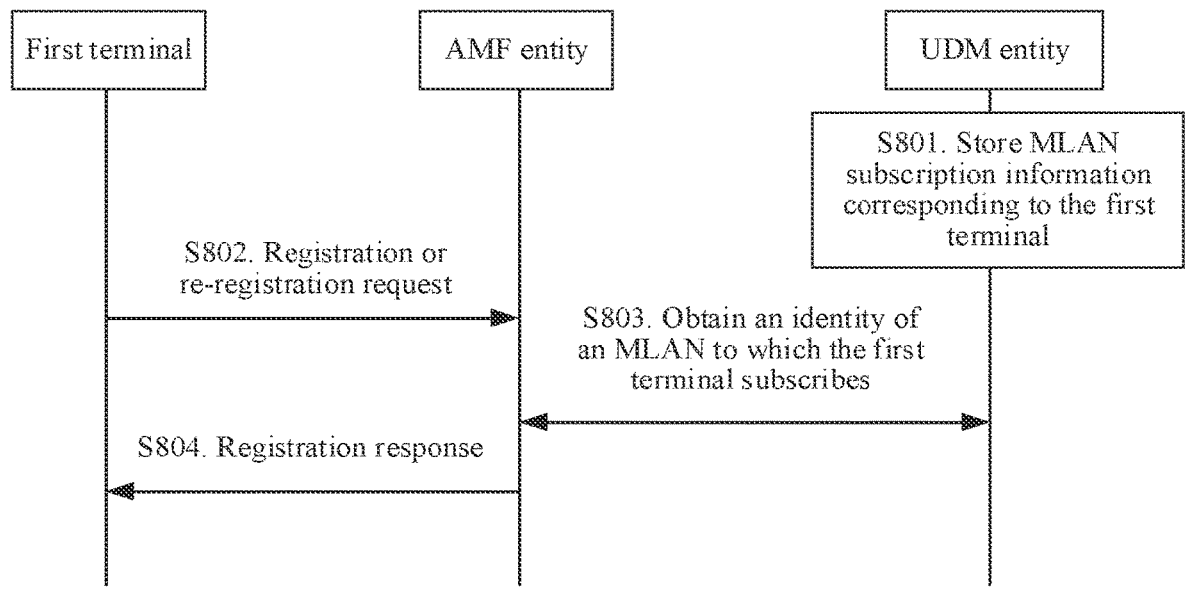
FIG. 8 is a schematic flowchart of an MLAN identity configuration method according to an embodiment of this application.

The following provides an MLAN identity configuration procedure using an example in which the identity of the MLAN to which a first terminal subscribes is configured on the first terminal. A schematic flowchart of the MILAN identity configuration procedure is shown in FIG. 8, and the procedure includes the following steps.

S801. When the first terminal subscribes to an MLAN service, a UPF entity stores MLAN subscription information corresponding to the first terminal, where the MLAN subscription information corresponding to the first terminal includes the identity of the MLAN to which the first terminal subscribes.

Optionally, if the identity of the MLAN to which the first terminal subscribes corresponds to a service area, the MLAN subscription information corresponding to the first terminal may further include information about the specific service area corresponding to the identity of the MLAN to which the first terminal subscribes.

Certainly, the information about the specific service area corresponding to the identity of the MLAN to which the first terminal subscribes may be further configured on another network device. For example, the information about the specific service area corresponding to the identity of the MLAN to which the first terminal subscribes is configured on one or more devices of a PCF entity, an AMF entity, and an SMF entity. In this case, when the first terminal initiates an MLAN session establishment procedure, these network devices may determine, based on a current location of the first terminal and the information about the specific service area corresponding to the identity of the MLAN to which the first terminal subscribes, whether the first terminal falls within the specific service area corresponding to the identity of the MLAN to which the first terminal subscribes. This is not specifically limited in this embodiment of this application.

S802. The first terminal sends a registration or re-registration request to the AMF entity, such that the AMF entity receives the registration or re-registration request from the first terminal.

S803. The AMF entity obtains, from the UDM entity, the identity of the MLAN to which the first terminal subscribes.

Optionally, if the identity of the MLAN to which the first terminal subscribes corresponds to the specific service area, and the information about the specific service area corresponding to the identity of the MLAN to which the first terminal subscribes is not configured on the AMF entity, the AMF entity further obtains, from a device such as the UDM entity, the PCF entity, or the SMF entity configured with the information about the specific service area corresponding to the identity of the MLAN to which the first terminal subscribes, the information about the specific service area corresponding to the identity of the MLAN to which the first terminal subscribes. This is not specifically limited in this embodiment of this application.

S804. The AMF entity sends a registration response to the first terminal, such that the first terminal receives the registration response from the AMF entity, where the registration response carries the identity of the MLAN to which the first terminal subscribes.

Optionally, in this embodiment of this application, after the AMF entity obtains, from the UDM entity, the identity of the MLAN to which the first terminal subscribes, if the identity of the MLAN to which the first terminal subscribes corresponds to the specific service area, the AMF entity needs to determine, based on information about a current registration area of the first terminal and the information about the specific service area corresponding to the identity of the MLAN to which the first terminal subscribes, whether the current registration area of the first terminal overlaps the specific service area corresponding to the identity of the MLAN to which the first terminal subscribes. If the current registration area of the first terminal overlaps the specific service area corresponding to the identity of the MLAN to which the first terminal subscribes, the AMF entity sends the registration response to the first terminal. The registration response carries the identity of the MLAN to which the first terminal subscribes. Optionally, in this case, the registration response may further include the information about the specific service area corresponding to the identity of the MLAN to which the first terminal subscribes, such that the first terminal may initiate, based on the information about the specific service area corresponding to the identity of the MLAN to which the first terminal subscribes, the MLAN session establishment procedure in the specific service area corresponding to the identity of the MLAN to which the first terminal subscribes. This is not specifically limited in this embodiment of this application.

In this way, the first terminal can obtain the identity of the MLAN to which the first terminal subscribes, and can initiate the MLAN session establishment procedure subsequently based on the identity of the MLAN to which the first terminal subscribes. For details, refer to the embodiments shown in FIG. 4A to FIG. 7C. Details are not described herein again.

In addition, for a procedure in which the identity of the MLAN to which the second terminal subscribes is configured on a second terminal, refer to the foregoing procedure in which the identity of the MLAN to which the first terminal subscribes is configured on the first terminal. Details are not described herein again.

The solutions provided in this application are described above mainly from a perspective of interaction between the network elements. It may be understood that, to implement the foregoing functions, the first user plane function entity and the second user plane function entity include corresponding hardware structures and/or software modules for performing the functions. A person skilled in the art should be easily aware that units and algorithm steps in the examples described with reference to the embodiments disclosed in this specification, may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first user plane function entity and the second user plane function entity may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. In actual implementation, another division manner may be used.

Figure 9:
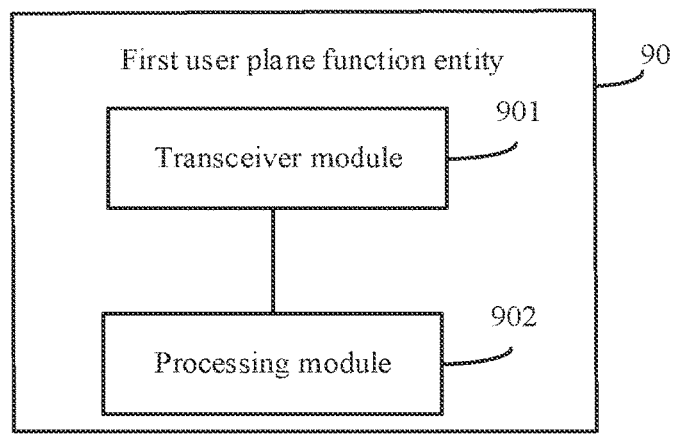
FIG. 9 is a schematic structural diagram of a first user plane function entity according to an embodiment of this application.

For example, if the function modules are divided through integration, FIG. 9 is a schematic structural diagram of the first user plane function entity in the foregoing embodiments. The first user plane function entity 90 includes a transceiver module 901 and a processing module 902. The transceiver module 901 is configured to receive a data packet from a first terminal through an uplink path corresponding to the first terminal, where the data packet carries addressing information of a second terminal, and the first user plane function entity is a user plane function entity currently accessed by the first terminal. The processing module 902 is configured to determine path information of a second user plane function entity based on information about the uplink path corresponding to the first terminal and the addressing information of the second terminal, where the second user plane function entity is a user plane function entity currently accessed by the second terminal. The transceiver module 901 is further configured to send the data packet to the second user plane function entity based on the path information of the second user plane function entity, such that the second user plane function entity sends the data packet to the second terminal through a downlink path corresponding to the second terminal.

Optionally, the processing module 902 is configured to determine, based on the information about the uplink path corresponding to the first terminal, an identity of an MLAN to which the first terminal subscribes; and determine the path information of the second user plane function entity based on the identity of the MLAN and the addressing information of the second terminal.

Optionally, the processing module 902 is further configured to after determining, based on the information about the uplink path corresponding to the first terminal, the identity of the to which the first terminal subscribes, determine, based on the identity of the MLAN and the addressing information of the second terminal, that information about the downlink path corresponding to the second terminal is not stored.

Optionally, that the processing module 902 determines, based on the information about the uplink path corresponding to the first terminal, the identity of the MLAN to which the first terminal subscribes includes determining, based on the information about the uplink path corresponding to the first terminal and a first correspondence, the identity of the MLAN to which the first terminal subscribes, where the first correspondence includes a correspondence between the information about the uplink path corresponding to the first terminal and the identity of the MLAN.

Optionally, that the processing module 902 determines the path information of the second user plane function entity based on the identity of the MLAN and the addressing information of the second terminal includes determining, the path information of the second user plane function entity based on the identity of the MLAN, the addressing information of the second terminal, and a second correspondence, where the second correspondence includes a correspondence between the addressing information of the second terminal, the path information of the second user plane function entity, and the identity of the MLAN.

Optionally, that the processing module 902 determines the path information of the second user plane function entity based on the identity of the MLAN and the addressing information of the second terminal includes sending the identity of the MLAN and the addressing information of the second terminal to a session management function entity, where the identity of the and the addressing information of the second terminal are used to determine the path information of the second user plane function entity; and receiving from the session management function entity, the path information of the second user plane function entity.

Optionally, the information about the uplink path corresponding to the first terminal includes a tunnel identifier of the first user plane function entity allocated for the first terminal, the information about the downlink path corresponding to the second terminal includes a tunnel identifier of an access device allocated for the second terminal, and the path information of the second user plane function entity includes a tunnel identifier of the second user plane function entity.

All related content of the steps in the foregoing method embodiment may be cited in function descriptions of corresponding function modules, and details are not described herein again.

In this embodiment, the first user plane function entity 90 is presented in a form in which each function module is obtained through integration. The "module" herein may be an application-specific integrated circuit (ASIC), a circuit, a processor and a memory that execute one or more software programs or firmware programs, an integrated logic circuit, and/or another component that can provide the foregoing function. In a simple embodiment, a person skilled in the art may figure out that the first user plane function entity 90 may be in a form shown in FIG. 3.

For example, the processor 301 in FIG. 3 may invoke the computer executable instruction stored in the memory 303, and the first user plane function entity 90 is enabled to perform the data transmission method in the foregoing method embodiment.

The functions/implementation processes of the transceiver module 901 and the processing module 902 in FIG. 9 may be implemented by the processor 301 in FIG. 3 by invoking the computer executable instruction stored in the memory 303. Alternatively, the function/implementation process of the processing module 902 in FIG. 9 may be implemented by the processor 301 in FIG. 3 by invoking the computer executable instruction stored in the memory 303, and the function/implementation process of the transceiver module 901 in FIG. 9 may be implemented by the communications interface 304 in FIG. 3.

The first user plane function entity provided in this embodiment of this application may be configured to perform the foregoing data transmission method. Therefore, for technical effects that can be obtained by the first user plane function entity, refer to the foregoing method embodiment. Details are not described herein again.

In this embodiment, the first user plane function entity 90 is presented in a form in which each function module is obtained through integration. Certainly, the function modules of the first user plane function entity may be obtained through division based on corresponding functions in the embodiments of this application. This is not specifically limited in this embodiment of this application.

Optionally, an embodiment of this application provides a chip system. The chip system includes a processor configured to support a first user plane function entity in implementing the foregoing data transmission method, for example, determining the path information of the second user plane function entity based on the information about the uplink path corresponding to the first terminal and the addressing information of the second terminal. In a possible design, the chip system further includes a memory. The memory is configured to store a program instruction and data that are required by the first user plane function entity. The chip system may include a chip, or may include a chip and another discrete component. This is not specifically limited in this embodiment of this application.

All or some of the foregoing embodiments may be implemented using software, hardware, firmware, or any combination thereof. When a software program is used to implement the embodiments, the embodiments may be implemented or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are described in dependent claims that are different from each other, but this does not mean that these measures cannot be combined to produce a better effect.

Although this application is described with reference to features and the embodiments thereof, it is clear that various modifications and combinations may be made to this application without departing from the spirit and scope of this application. Correspondingly, the specification and accompanying drawings are merely example descriptions of this application defined by the accompanying claims, and are considered as any or all of modifications, variations, combinations, or equivalents that cover the scope of this application. A person skilled in the art can make various modifications and variations to this application without departing from the spirit and scope of this application. This application is intended to cover these modifications and variations of this application provided that the modifications and variations fall within the scope of protection defined by the following claims and their equivalent technologies.

The invention claimed is:

1. A data transmission method comprising:
receiving, by a first user plane function entity serving a first terminal, a data packet from the first terminal through an uplink path corresponding to the first terminal, wherein the data packet comprises first addressing information of a second terminal, and wherein the first addressing information comprises an internet protocol (IP) address or a media access control (MAC) address of the second terminal;
determining, by the first user plane function entity based on uplink information about the uplink path, an identity of a mobile local area network (MLAN), wherein the uplink information about the uplink path corresponds to the first terminal and comprises a first tunnel identifier of the first user plane function entity, and wherein the first tunnel identifier is allocated for the first terminal;

determining, by the first user plane function entity based on the identity of the MLAN and the first addressing information, first path information of a second user plane function entity serving the second terminal, wherein the first path information comprises a second tunnel identifier of the second user plane function entity, and wherein the second tunnel identifier identifies a second tunnel between the first user plane function entity and the second user plane function entity; and sending, by the first user plane function entity, the data packet to the second user plane function entity based on the first path information.

2. The data transmission method of claim 1, wherein determining the identity of the MLAN comprises determining, by the first user plane function entity based on the uplink information and a first correspondence, the identity of the MLAN, and wherein the first correspondence is between the uplink information and the identity of the MLAN.

3. The data transmission method of claim 2, further comprising:

receiving, by the first user plane function entity, a third N4 session message from a session management function entity, wherein the third N4 session message comprises the identity of the MLAN and the uplink information; and saving, by the first user plane function entity, the first correspondence between the identity of the MLAN, and the uplink information.

4. The data transmission method of claim 3, further comprising sending, by the session management function entity, the third N4 session message to the first user plane function entity.

5. The data transmission method of claim 1, wherein determining the first path information comprises determining, by the first user plane function entity, the first path information based on the identity of the MLAN, the first addressing information, and a second correspondence, and wherein the second correspondence is between the first addressing information, the first path information, and the identity of the MLAN.

6. The data transmission method of claim 5, further comprising:

receiving, by the first user plane function entity, a first N4 session message from a session management function entity, wherein the first N4 session message comprises the identity of the MLAN, the first addressing information, and the first path information; and saving, by the first user plane function entity, the second correspondence between the first addressing information, the first path information, and the identity of the MLAN.

7. The data transmission method of claim 1, wherein the first terminal and the second terminal are located in the MLAN.

8. The data transmission method of claim 1, further comprising determining, by the second user plane function entity based on the first path information and the first addressing information, a downlink path.

9. The data transmission method of claim 8, wherein determining the downlink path comprises:

determining, by the second user plane function entity based on the first path information, the identity of the MLAN; and determining, by the second user plane function entity based on the identity of the MLAN and the first addressing information, the downlink path.

10. The data transmission method of claim 1, further comprising establishing, by a session management function entity in the MLAN, the second tunnel between the first user plane function entity and the second user plane function entity.

11. The data transmission method of claim 10, wherein establishing the second tunnel comprises establishing, by the session management function entity, the second tunnel in a process of establishing a packet data unit (PDU) session of the first terminal.

12. The data transmission method of claim 10, wherein establishing the second tunnel comprises:

sending, by the session management function entity, a first N4 session message to the first user plane function entity, wherein the first N4 session message comprises a second identity of a second MLAN of the second terminal, the first addressing information, and the first path information; and saving, by the first user plane function entity, a correspondence between the first addressing information, the first path information, and the second identity of the second MLAN.

13. The data transmission method of claim 12, wherein establishing the second tunnel comprises:

sending, by the session management function entity, a second N4 session message to the second user plane function entity, wherein the second N4 session message comprises a first identity of a first MLAN of the first terminal, second addressing information of the first terminal, and second path information of the first user plane function entity;

determining, by the session management function entity based on the first identity and the second identity, that the first MLAN and the second MLAN are both the MLAN; and saving, by the first user plane function entity, a second correspondence between the second addressing information, the second path information of the first user plane function entity, and the first identity of the first MLAN.

14. A communication apparatus, wherein the communication apparatus is a first user plane function entity serving a first terminal or is a chip for the first user plane function entity, and wherein the communication apparatus comprises:

at least one processor; and one or more memories coupled to the at least one processor and configured to store instructions for execution by the at least one processor to:

receive a data packet from the first terminal through an uplink path corresponding to the first terminal, wherein the data packet comprises first addressing information of a second terminal, and wherein the first addressing information comprises an Internet Protocol (IP) or a media access control (MAC) address of the second terminal;

determine, based on uplink information about the uplink path, an identity of a mobile local area network (MLAN), wherein the uplink information about the uplink path corresponds to the first terminal and comprises a first tunnel identifier of the first user plane function entity, and wherein the first tunnel identifier is allocated for the first terminal;

determine, based on the identity of the MLAN and the first addressing information, first path information of a second user plane function entity serving the second terminal, wherein the first path information comprises a second tunnel identifier of the second user plane function entity, and wherein the second tunnel identifier identifies a second tunnel between the first user plane function entity and the second user plane function entity; and send, based on the first path information, the data packet to the second user plane function entity.

15. The communication apparatus of claim 14, wherein the at least one processor is configured to determines the identity of the MLAN based on the uplink information and a first correspondence, and wherein the first correspondence is between the uplink information and the identity of the MLAN.

16. The communication apparatus of claim 15, wherein the at least one processor is configured to:

receive a third N4 session message from a session management function entity, wherein the third N4 session message comprises the identity of the MLAN and the uplink information; and saving, by the first user plane function entity, the first correspondence between the identity of the MLAN, and the uplink information.

17. The communication apparatus of claim 14, wherein the at least one processor is configured to determines the first path information based on the identity of the MLAN, the first addressing information, and a second correspondence, and wherein the second correspondence is between the first addressing information, the first path information, and the identity of the MLAN.

18. The communication apparatus of claim 17, wherein the at least one processor is configured to:

receive a first N4 session message from a session management function entity, wherein the first N4 session message comprises the identity of the MLAN, the first addressing information, and the first path information; and save the second correspondence between the first addressing information, the first path information, and the identity of the MLAN.

19. The communication apparatus of claim 14, wherein the first terminal and the second terminal are located in the MLAN.

20. A non-transitory storage medium comprising instructions which, when executed by one or more processors of a first user plane function entity serving a first terminal, cause the first user plane function entity to:

receive a data packet from the first terminal through an uplink path corresponding to the first terminal, wherein the data packet comprises first addressing information of a second terminal, and wherein the first addressing information comprises an Internet Protocol (IP) or a media access control (MAC) address of the second terminal;

determine, based on uplink information about the uplink path, an identity of a mobile local area network (MLAN), wherein the uplink information about the uplink path corresponds to the first terminal and comprises a first tunnel identifier of the first user plane function entity, and wherein the first tunnel identifier is allocated for the first terminal;

determine, based on the identity of the MLAN and the first addressing information, first path information of a second user plane function entity serving the second terminal, wherein the first path information comprises a second tunnel identifier of the second user plane function entity, and wherein the second tunnel identifier identifies a second tunnel between the first user plane function entity and the second user plane function entity; and send the data packet to the second user plane function entity based on the first path information.

21. The non-transitory storage medium of claim 20, wherein when the instructions are executed by the processor, the instructions further cause the one or more processors to determine, based on the uplink information and a first correspondence, the identity of the MLAN, and wherein the first correspondence is between the uplink information and the identity of the MLAN.

22. The non-transitory storage medium of claim 20, wherein when the instructions are executed by the processor, the instructions further cause the one or more processors to determine the first path information based on the identity of the MLAN, the first addressing information, and a second correspondence, and wherein the second correspondence is between the first addressing information, the first path information, and the identity of the MLAN.

23. The non-transitory storage medium of claim 20, wherein the first terminal and the second terminal are located in the MLAN.

* * * * *